US008729903B2

(12) United States Patent
Srnka et al.

(10) Patent No.: US 8,729,903 B2
(45) Date of Patent: May 20, 2014

(54) METHOD FOR REMOTE IDENTIFICATION AND CHARACTERIZATION OF HYDROCARBON SOURCE ROCKS USING SEISMIC AND ELECTROMAGNETIC GEOPHYSICAL DATA

(75) Inventors: Leonard J. Srnka, Bellaire, TX (US);
Quinn R. Passey, Kingwood, TX (US);
Kevin M. Bohacs, Houston, TX (US);
David R. Converse, Houston, TX (US);
Yaping Zhu, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 350 days.

(21) Appl. No.: 12/872,783

(22) Filed: Aug. 31, 2010

(65) Prior Publication Data
US 2011/0108283 A1 May 12, 2011

Related U.S. Application Data

(60) Provisional application No. 61/259,459, filed on Nov. 9, 2009.

(51) Int. Cl.
*G01V 3/00* (2006.01)
*G01V 3/02* (2006.01)
*G01S 13/00* (2006.01)
*G01V 1/00* (2006.01)

(52) U.S. Cl.
USPC ........... 324/337; 324/357; 324/350; 324/334; 342/22; 702/14

(58) Field of Classification Search
USPC .......................................... 324/331, 337, 350
See application file for complete search history.

(56) References Cited

U.S. PATENT DOCUMENTS

| 3,975,674 | A | * | 8/1976 | McEuen | 324/357 |
|---|---|---|---|---|---|
| 4,862,089 | A | * | 8/1989 | Sigal | 324/350 |
| 4,884,455 | A | * | 12/1989 | Vinegar et al. | 73/798 |
| 4,994,747 | A | * | 2/1991 | Stolarczyk | 324/334 |
| H001524 | H | * | 4/1996 | Thompson et al. | 324/334 |
| 5,563,513 | A | | 10/1996 | Tasci et al. | |
| 6,332,109 | B1 | | 12/2001 | Sheard et al. | |

(Continued)

FOREIGN PATENT DOCUMENTS

| EP | 0341109 | 9/1992 |
|---|---|---|
| FR | 2674961 | 10/1992 |

(Continued)

OTHER PUBLICATIONS

Feng Shen, Shaoguo Yang, Integrated Fractured Reservoir Characterization by Using 3-D Prestack Seismic Data and Log Data, 2003 SEG Annual Meeting, Oct. 26-31, 2003, Dallas, Texas Copyright 2003, Society of Exploration Geophysicists, Abstract.*

(Continued)

*Primary Examiner* — Patrick Assouad
*Assistant Examiner* — Christopher McAndrew
(74) *Attorney, Agent, or Firm* — ExxonMobil Upstream Research Company

(57) ABSTRACT

Method for assessing hydrocarbon source rock potential of a subsurface region without well log information. The method uses surface electromagnetic (121) and seismic (122) survey data to obtain vertical profiles of resistivity and velocity (123), which are then analyzed in the same way as well log data are analyzed by the well known Delta Log R method (124).

29 Claims, 8 Drawing Sheets

(56) References Cited

U.S. PATENT DOCUMENTS

| | | | |
|---|---|---|---|
| 6,351,991 B1* | 3/2002 | Sinha | 73/152.01 |
| 6,603,313 B1 | 8/2003 | Srnka | |
| 6,859,038 B2 | 2/2005 | Ellingsrud et al. | |
| 6,954,698 B2* | 10/2005 | Tryggvason | 702/5 |
| 7,023,213 B2 | 4/2006 | Nichols | |
| 7,038,456 B2* | 5/2006 | Ellingsrud et al. | 324/334 |
| 7,116,108 B2 | 10/2006 | Constable | |
| 7,145,341 B2* | 12/2006 | Ellingsrud et al. | 324/334 |
| 7,202,669 B2* | 4/2007 | Ellingsrud et al. | 324/334 |
| 7,203,599 B1 | 4/2007 | Strack et al. | |
| 7,450,053 B2* | 11/2008 | Funk et al. | 342/22 |
| 2007/0078603 A1* | 4/2007 | Berg | 702/14 |

FOREIGN PATENT DOCUMENTS

| | | |
|---|---|---|
| WO | WO 2004/083898 | 9/2004 |
| WO | WO 2006/089269 | 8/2006 |
| WO | WO 2011/026995 | 3/2011 |
| WO | WO 2011/026996 | 3/2011 |

OTHER PUBLICATIONS

Publisher Society of Exploration Geophysicists Language English Document ID 1986-0527 Content Type Conference Paper Albert Tarantola, A Strategy for Nonlinear Elastic Inversion of Seismic Reflection Data, 1986 SEG Annual Meeting, Nov. 2 Geophysics, vol. 51, No. 10 (Oct. 1986); p. 1893-1903, 4 FIGS.*

Q.R. Passey, S. Creaney, J.B. Kulla, F.J. Moretti, and J.D. Stroud., A practical MOdel for Organic Richness from porosity and Resistivity Logs, 1990, The American Association of Petroleum Geologists, pp. 1777-1794.*

Feng Shen, Shaoguo Yang, Integrated Fractured Reservoir Characterization by Using 3-D Prestack Seismic Data and Log Data, 2003 SEG Annual Meeting, Oct. 26-31, 2003, Dallas, Texas Copyright 2003, Society of Exploration Geophysicists Abstract.*

Publisher Society of Exploration Geophysicists Language English Document ID 1986-0527 Content Type Conference Paper Albert Tarantola, A Strategy for Nonlinear Elastic Inversion of Seismic Reflection Data, 1986 SEG Annual Meeting, Nov. 2-6, 1986, Houston, Texas, Society of Exploration Geophysicists, ID 1986-0527, pp. 1893-1903.*

Wen-Fong Chang and George A. McMechan, 3-D elastic prestack, reverse-time depth migration, GeoRef, Copyright 2005, American Geological Institute, Geophysics Apr. 1994 v. 59 No. 4 p. 597-609.*

Passey et al., (1990), "A Practical Model for Organic Richness from Porosity and Resistivity Logs," AAPG Bulletin 74, pp. 1777-1794.*

Meyer, B.L. et al. (1984), "Identification of Source Rocks on Wireline Logs by Density/Resistivity and Sonic Transit Time/Resistivity Crossplots," AAPG Bulletin 68, pp. 121-129.*

Tarantola, A. (1984), "Inversion of Seismic Reflection Data in the Acoustic Approximation," Geophysics 49, pp. 1259-1266.*

Albert Tarantola, A Strategy for Nonlinear Elastic Inversion of Seismic Reflection Data, 1986 SEG Annual Meeting, Society of Explorat Nov. 2-6, 1986 , Houston, Texas, Society of Exploration Geophysicists, ID 1986-0527, pp. 1893-1903,.*

Abdullah, F.H. et al. (2005), "Organic matter identification in source and reservoir carbonate in the Lower Cretaceous Mauddud Formation in Kuwait," GeoArabia, v. 10, No. 4, 18 pgs.

Alkhalifa, T. et al. (1995), "Velocity Analysis for Transversely Isotropic Media," Geophysics 60, pp. 1550-1556.

Ambrose, A. (2010), "New Pore-Scale Considerations for Shale Gas in Place Calculations," SPE 131772.

Bohacs, K.M. (1998) "Contrasting Expressions of Depositional Sequences in Mudrocks From Marine to Non-Marine Environs," Shales and Mudstones I, Schweizerbart'sche Verlagbuchhandlung, pp. 33-78.

Bohacs, K.M. et al. (2005), "Production, Destruction, and Dilution—The Many Paths to Source-Rock Development," SEPM Special Publication 82, pp. 61-101.

Carazzone, J.J. (1986), "Inversion of P-SV Seismic Data, Geophysics" 51, pp. 1056-1068.

Carazzone, J.J. (2005), "Three Dimensional Imaging of Marine CSEM Data," 75th Annual International meeting, SEG Expanded Abstracts, pp. 575-577.

Carcione, J.M. (2001), "AVO Effects of a Hydrocarbon Source-Rock Layer," Geophysics 66, pp. 419-427.

Chen, J. et al. (2007), "Effects of Uncertainty in Rock-Physics Models on Reservoir Parameter Estimation Using Marine Seismic AVA and CSEM Data," 77th Annual International Meeting, SEG Expanded Abstracts, pp. 457-461.

Commer, M. et al. (2008), "Massively Parallel Electrical-Conductivity Imaging of Hydrocarbons Using the IBM Blue Gene/L Supercomputer," IBM Journal of Research and Development 52, pp. 93-104.

Constable, S. et al. (2007), "An Introduction to Marine Controlled-Source Electromagnetic Methods for Hydrocarbon Exploration," Geophysics 72, pp. WA3-WA12.

Constable, S. (2006), "Marine electromagnetic methods—A new tool for offshore exploration," The Leading Edge, pp. 438-444.

Constable, S. et al. (2006), "Mapping thin resistors and hydrocarbons with marine EM methods: Insights from 1D modeling," Geophysics, v. 71, No. 2, pp. G43-G51.

Creaney, S. et al. (1993), "Recurring Patterns of Total Organic Carbon and Source Rock Quality Within a Sequence Stratigraphic Framework," AAPG Bulletin 77, pp. 386-401.

Dawson, W.C. et al. (1999), "Top Seal Character and Sequence Stratigraphy of Selected Marine Shales in Gulf Coast Style Basins," Gulf Coast Association of Geological Societies Transactions 49, pp. 190-197.

Dix, C.H. (1955), "Seismic Velocities From Surface Measurements," Geophysics 20, pp. 68-86.

Durham, L.E. (2009), "Seismic provides same result as well data, Getting to the Source—Differently," AAPG Explorer, 4 pgs.

Ellingsrud, S. et al. (2002), "Remote Sensing of Hydrocarbon Layers by Seabed Logging (SBL): Results From a Cruise Offshore Angola," The Leading Edge 21, pp. 972-982.

Goodway, B. (2001), Avo and Lamé Constants for Rock Parameterization and Fluid Detection, CSEG Recorder 26, pp. 39-60.

Goodway, B. et al. (2006), Practical applications of P-wave AVO for unconventional gas Resource Plays—I: Seismic petrophysics and isotropic AVO, CSEG Recorder, Special Issue 31, pp. 90-95.

Green, K.E. et al. (2005), "R3M Case Studies: Detecting Reservoir Resistivity in Complex Settings," 75th Annual International Meeting, SEG Extended Abstracts.

Harlan, W.S. et al. (2008), "Introduction to the Supplement on Velocity Estimation for Depth Imaging," Geophysics 73, pp. VE1-VE3.

Harris, P. et al. (2007), "Enhancing the Resolution of CSEM Inversion Using Seismic Constraints," 77th Annual International meeting, SEG Expanded Abstracts, pp. 604-608.

Hohmann, G.W. et al. (1987), Chapter 8—Inversion of Controlled-Source Electromagnetic Data, in Electromagnetic Methods in Applied Geophysics—Theory, 1, SEG, pp. 469-504.

Hood, A.C. et al. (1975), "Organic Metamorphism and the General of Petroleum", AAPG Bulletin, v. 59, pp. 986-996.

Hou et al. (2006), "Reservoir-Parameter Identification Using Minimum Relative Entropy-Based Bayesian Inversion of Seismic AVA and Marine CSEM Data," Geophysics 71, pp. O77-O88.

Hoversten et al. (2006), "Direct Reservoir Parameter Estimation Using Joint Inversion of Marine Seismic AVA and CSEM Data", Geophysics 71, pp. C1-C13.

Hubral, P. et al. (1980), Interval Velocities from Seismic Reflection Time Measurements, Society of Exploration Geophysicists, pp. 1-4, 5-8, 9-10, 197-202.

Jing, C. et al. (2008), "CSEM Inversion: Impact of Anisotropy, Data Coverage, and Initial Models", 78th Annual International Meeting, SEG, Expanded Abstracts, pp. 604-608.

Jupp, et al. (1977), "Resolving Anisotropy in Layered Media by Joint Inversion," Geophysical Prospecting 25, pp. 460-470.

Keys, R.G. (2002), "An Approximation for the Xu-White Velocity Model," Geophysics 67, pp. 1406-1414.

(56) References Cited

OTHER PUBLICATIONS

Lu, X. et al. (2007), "Understanding Anisotropy in Marine CSEM Data," 77th Annual International Meeting, SEG, Expanded Abstracts, pp. 633-637.
MacGregor, L. et al. (2007), "DeRisking Exploration Prospects Using Integrated Seismic and Electromagnetic Data—a Falkland Islands Case Study," The Leading Edge 26, pp. 356-359.
Meissner, F.F. (1978), "Petroleum Geology of the Bakken Formation Williston Basin, North Dakota and Montana," in The Economic Geology of the Williston Basin, Montana Geological Society, 1978 Williston Basin Symposium, pp. 207-227.
Mitchum, R.M. et al. (1977), "Seismic Stratigraphy and Global Changes of Sea Level: Part 2. The Depositional Sequence as a Basic Unit for Stratigraphic Analysis: Section 2, Application of Seismic Reflection Configuration to Stratigraphic Interpretation, Seismic Stratigraphy—Applications to Hydrocarbon Exploration," AAPG Memoir 26, pp. 53-62.
Mitchum, R.M. et al. (1977), "Seismic Stratigraphy and Global Changes of Sea Level: Part 6. Stratigraphic Interpretation of Seismic Reflection Patterns in Depositional Sequences: Section 2. Application of Seismic Reflection Configuration to Stratigraphic Interpretation, Seismic Stratigraphy—Applications to Hydrocarbon Exploration," AAPG Memoir 26, pp. 117-133.
Mitchum, R.M. et al. (1977), "Seismic Stratigraphy and Global Changes of Sea Level: Part 7. Stratigraphic Interpretation of Seismic Reflection Patterns in Depositional Sequences: Section 2. Application of Seismic Reflection Configuration to Stratigraphic Interpretation, Seismic Stratigraphy—Applications to Hydrocarbon Exploration," AAPG Memoir 26, pp. 135-143.
Newman, G.A. et al. (2000), "Three-Dimensional Magnetotelluric Inversion Using Non-Linear Conjugate Gradients," Geophysical Journal International 140, pp. 410-424.
Omran, A.W. (2001), Log-Derived Source Rock Evaluation of the Oligocene-Pliocene Sequences in Some Wells, Northeast Nile Delta, Egypt, Bull. Fac. Sci. Assiut Univ. 30(IF) P-P, pp. 147-170.
Ramsayer, G.R. (1979), "Seismic stratigraphy, a fundamental exploration tool," $11^{th}$ Annual Offshore Technology Conference Proceedings, pp. 101-109.
Singh, S. et al., (2008), "Full Elastic Waveform Inversion: Future of Quantitative Seismic Imaging," 78th Annual International Meeting, SEG Expanded Abstracts, pp. 1905-1909.
Squires, L.J. et al. (1992), "The Effects of Statics on Tomographic Velocity Reconstructions," Geophysics 57, pp. 353-363.
Srnka, L.J. et al. (2006), "Remote Reservoir Resistivity Mapping—an Overview," The Leading Edge 25, pp. 972-975.
Stoffa, P.L. et al. (1991), "Nonlinear Multiparameter Optimization Using Genetic Algorithms: Inversion of Plane-Wave Seismograms," Geophysics 56, pp. 1794-1810.
Symes, W.W. et al. (1991), "Velocity Inversion by Differential Semblance Optimization," Geophysics 56, pp. 654-663.
Urn, E.S. et al. (2007), "On the Physics of the Marine Controlled-Source Electromagnetic Method," Geophysics 72, pp. WA13-WA26.
Vail, et al. (1977), "Seismic Stratigraphy and Global Changes of Sea Level: Part 5: ,Chronostratigraphic Significance of Seismic Reflections, in Seismic Stratigraphy—Applications to Hydrocarbon Exploration," AAPG Memoir 26, pp. 99-116.
Vernick, L. et al. (1992), "Ultrasonic Velocity and Anisotropy of Hydrocarbon Source Rocks," Geophysics 57, pp. 727-735.
Weiss, C.J. et al. (2006), "Mapping Thin Resistors and Hydrocarbons With Marine EM Methods, Part II—Modeling and Analysis in 3D," Geophysics 71, pp. 321-332.
Xu, S. et al. (1995), "A New Velocity Model for Clay-Sand Mixtures," Geophys. Prosp. 43, pp. 91-118.

* cited by examiner

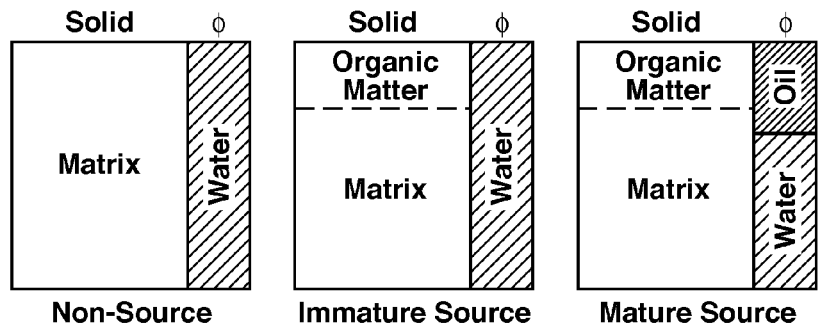
FIG. 1A FIG. 1B FIG. 1C
(Prior Art)
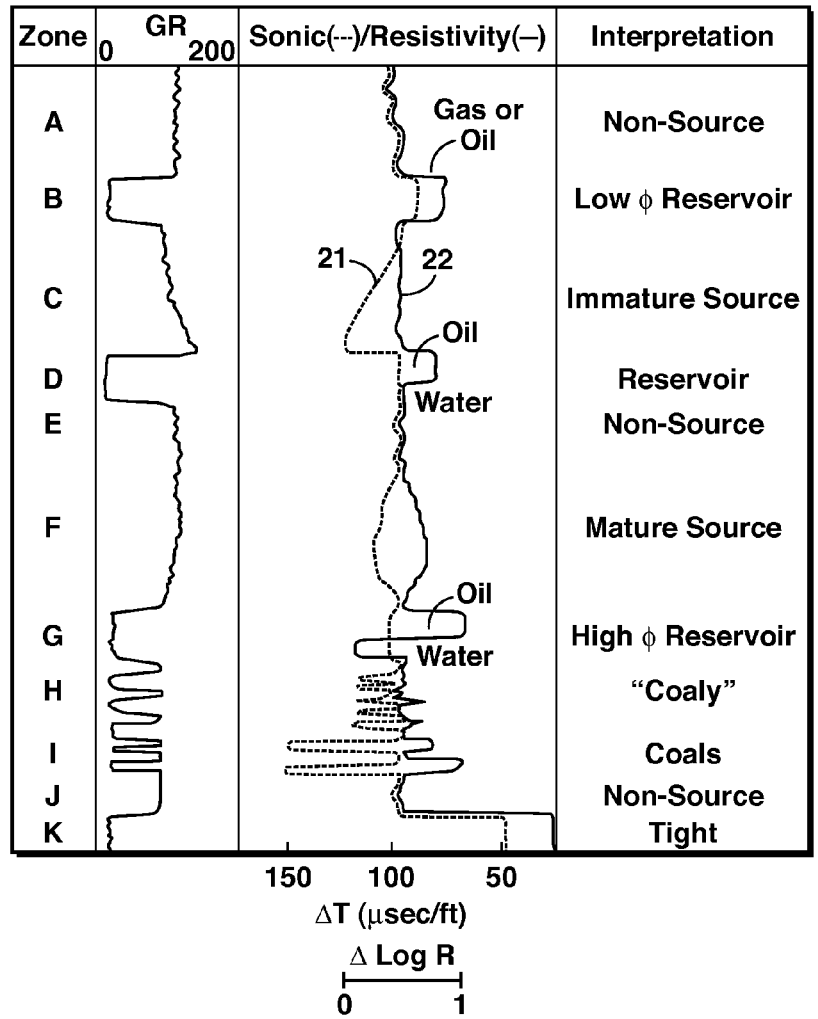
FIG. 2
(Prior Art)

METHOD FOR REMOTE IDENTIFICATION AND CHARACTERIZATION OF HYDROCARBON SOURCE ROCKS USING SEISMIC AND ELECTROMAGNETIC GEOPHYSICAL DATA

CROSS REFERENCE TO RELATED APPLICATION

This application claims the benefit of U.S. Provisional Application 61/259,459, filed Nov. 9, 2009, entitled Method for Remote Identification and Characterization of Hydrocarbon Source Rocks Using Seismic and Electromagnetic Geophysical data, the entirety of which is incorporated by reference herein.

FIELD OF THE INVENTION

This invention relates generally to the field of hydrocarbon exploration, and more particularly to identification and characterization of hydrocarbon (oil, gas, and natural-gas liquids) source rocks in onshore and offshore sedimentary basins, using combined seismic and electromagnetic geophysical data acquired at or near the surface of the earth, sea, or seafloor. The invention also relates to subsurface formation interval seismic velocity, bulk density, and electrical resistivity measured from well logs in a borehole as means to calibrate the seismic and electromagnetic geophysical data.

BACKGROUND OF THE INVENTION

A key element in successful hydrocarbon exploration is the existence of adequate source rock in the basin, in terms of both total organic content (TOC) and level of organic metamorphism (LOM) or "maturity". In undrilled or poorly explored basins, source adequacy is essentially unknown and is a major exploration risk. However, once a well is drilled, a formation evaluation method called Delta Log R (or $\Delta$ Log R) is available to assess source rock quality, using overlays of suitably scaled resistivity log and sonic log (or density log) data. See Passey et al., "A Practical Model for Organic Richness from Porosity and Resistivity Logs," *AAPG Bulletin* 74, 1777-1794 (1990), which is incorporated by reference herein in its entirety. The Delta Log R method relies on first-order rock physics that predicts reduced vertical acoustic velocities (due to the presence of kerogen) and increased horizontal resistivities (reflecting kerogen content and in-situ generation of hydrocarbons) in organic-rich rocks as functions of TOC and LOM. The present invention is a method to perform Delta Log R analyses in the absence of a well at the point under investigation, using seismic and electromagnetic geophysical data measured remotely.

Hydrocarbon source rock mapping in untested (un-drilled) basins, and in unexplored areas of explored basins, has been addressed primarily by geological interpretation of seismic reflection patterns (K. M. Bohacs, 1998, "Contrasting Expressions of Depositional Sequences in Mudrocks From Marine to Non-Marine Environs," *Shales and Mudstones I*, Schweizerbart'sche Verlagbuchhandlung, pp. 33-78); by basin history and evolution modeling, and by basin analog and environment-of-deposition studies (Bohacs et al., "Production, Destruction, and Dilution—The Many Paths to Source-Rock Development," *SEPM Special Publication* 82, 61-101 (2005); S. Creaney and Q. R. Passey, op. cit. 1993). However, these approaches have large uncertainties, and generally have not definitely identified the presence of adequate source rocks. Source rocks typically occupy a relatively small fraction of total shale volume, and may not have clear seismic reflection boundaries within the shale interval, so their detection can be difficult. Known source rocks of commercial importance vary in thickness within a common range of about 30 to 300 meters. What is needed is a remote geophysical method, having at least moderate vertical resolution and accuracy that can identify and characterize source rocks in this thickness range, and that has a useful subsurface/sub-seafloor depth of investigation to 3000 meters or more. Given the increasingly limited commercial access to sedimentary basins due to several factors, remotely identifying source rock in unexplored areas would have substantial benefits for worldwide exploration opportunities. The present invention's method for combining seismic and electromagnetic geophysical data satisfies this need.

1. Delta Log R Borehole Method

Delta Log R is a proven technique for identifying and calculating TOC in organic-rich rocks using well logs. (Passey et al., supra; see also Creaney and Passey, "Recurring Patterns of Total Organic Carbon and Source Rock Quality Within a Sequence Stratigraphic Framework," *AAPG Bulletin* 77, 386-401 (1993); Meyer and Nederlof, "Identification of Source Rock on Wireline Logs by Density/Resistivity and Sonic Transit Time/Resistivity Crossplots," *AAPG Bulletin* 68, 121-129 (1984); Meissner, "Petroleum Geology of the Bakken Formation Williston Basin, North Dakota and Montana," in *The Economic Geology of the Williston Basin, Montana Geological Society,* 1978 Williston Basin Symposium, 207-227; and "Method for Evaluating the Content of Organic Matter of Sedimentary Rocks From Data Recorded in Wells by Logging Sondes," French Patent No. 2,674,961 to Ros, Carpentier and Huc (Apr. 8, 1991)) The method employs the overlay of a log response scaled to represent total porosity (usually the sonic transit-time log) onto a scaled resistivity curve that preferably measures deep formation resistivity. The log resistivity that is measured is usually assumed to be the horizontal component, due primarily to the design of the borehole tool. Conversely, the log sonic transit time that is measured is usually assumed to be the vertical component, again due primarily to the design of the borehole tool. The response scaling is performed using baselines for the logs in non-source clay-rich rocks such as shales, identified using primarily the gamma-ray (GR) log. In the common practice of the Delta Log R art, the transit-time curve and the resistivity curve are scaled so that their relative magnitude is −100 microseconds/foot of transit time per two logarithmic resistivity cycles. In low-TOC water-wet porous rocks, the two curves are very nearly parallel and can be closely overlain, since both respond to porosity. But in high-TOC source rocks (or in reservoirs that contain hydrocarbons) a separation occurs between these curves due to two main effects: 1) the porosity curve responds to the presence of low-density low-velocity kerogen, and 2) the resistivity curve responds to the formation fluid. Level of organic metamorphism (LOM) is estimated in several ways, including vitrinite reflectance of subsurface samples and estimates of thermal and burial history. LOM describes thermal maturity (metamorphism) of sedimentary organic matter during burial—the cumulative effect of exposure to elevated temperature. It is a numerical scale (zero to twenty) which is applicable to the entire thermal range of generation and destruction of petroleum. When maturity is low and no hydrocarbons have been generated, the curve separation is caused only by the porosity response to low density and/or low velocity TOC. Conversely, when maturity is high in such organic-rich rocks or in hydrocarbon-bearing reservoirs, the resistivity response increases due to the generated hydrocarbons.

FIGS. 1A-C depict the solid and fluid components in hydrocarbon source and non-source rocks. Organic-rich rocks are assumed to be composed of three components: (1) the rock matrix, (2) the solid organic matter, and (3) the fluid(s) filling the pore space, typically water or oil/gas. Non-source rocks are composed primarily of only two components: the matrix and the fluid filling the pore space (FIG. 1A). In immature source rocks, solid organic matter and rock matrix make up the solid fraction, and formation water fills the pore space (FIG. 1B). As the source rock matures, a portion of the solid organic matter is transformed to liquid (or gaseous) hydrocarbons, which move into the pore space, displacing the formation water (FIG. 1C). The magnitude of the curve separation in non-reservoir rock intervals is then calibrated to TOC and LOM from core samples and from empirical and/or statistical relationships from the same or similar sedimentary basins. The Delta Log R method can thus be used to assess organic richness of subsurface formations in a wide variety of facies and lithologies as depicted in FIGS. 2 and 3. Note that the gamma ray log in FIG. 2, which aids in interpretation of the depth intervals and confirms identification and elimination from the analysis of reservoir intervals, would normally not be available in situations where the Remote $\Delta$ Log R of the present invention is applied, because it is the organic-rich source intervals that are of interest.

In applications of Delta Log R, the amplitudes of the transit-time curve (21 in FIG. 2) and the resistivity curve (22) are scaled such that their relative scaling is −100 μsec/ft (−328 μsec/m) per two logarithmic resistivity cycles (i.e., a ratio of −50 μsec/ft or −164 μsec/m to one resistivity cycle), as is indicated by the $\Delta$T and $\Delta$ Log R scales at the bottom of FIG. 2. The two curves are overlain, i.e. baselined, in fine-grained, "non-source" rock intervals such as zones A and E in FIG. 2. A baseline condition exists when the two curves "track" or directly overlie each other over a significant depth range. Typically, zone A may extend upward for a considerable distance, but for display purposes, this is truncated in FIG. 2 leaving only the lower portion. The discovery underlying Delta Log R was that after the aforementioned scaling and baselining, the irregularities of intervals such as A and E match up very well. With the baseline established, organic-rich intervals can be recognized by separation and non-parallelism of the two curves, such as the intervals labeled "immature source" and "mature source" in FIG. 2. The separation between them, designated as $\Delta$ log R in FIG. 2, can be measured at each depth increment. It may be noted that both zones C and F exhibit significant $\Delta$ Log R separation. It is difficult to differentiate the two zones from the sonic log alone, but the resistivity log distinguishes them. In zone C, the resistivity log shows no deviation from the baseline, but in zone F the resistivity increases, indicating that hydrocarbons have displaced water in the pore spaces, thereby increasing resistivity. Thus, zone F is mature source rock whereas zone C is immature source rock.

The $\Delta$ Log R separation is linearly related to TOC and is a function of maturity. Using a $\Delta$ Log R calibration diagram such as FIG. 3, the $\Delta$ Log R separation can be transformed directly to a quantitative estimate of TOC if the maturity (in level of organic metamorphism units, LOM; see for example Hood et al., 1975) can be determined or estimated. In practice, LOM is obtained from a variety of sample analyses (e.g. vitrinite reflectance, thermal alteration index, or $T_{max}$ from RockEval pyrolysis), or from estimates of burial and thermal history. If the maturity (LOM) is incorrectly estimated, the absolute TOC values will be somewhat in error, but the vertical variability in TOC will be correctly represented. With reference to FIG. 3, the dark line 31 should be used for maturity less than LOM 6. Immature source rock has LOM of 6 to 7 or less. The LOM range of approximately 7-11 indicates mature source rock, meaning that oil or gas should be present in the vicinity. Above LOM 11 is considered over-mature source rock; an example is shale gas. The Delta Log R method works even in the over-mature source rock range, and therefore, as will be explained below, so does the present inventive method. Experience has shown that an LOM in the 10-10.5 range should be used for LOM 11 or greater for estimating TOC; i.e., the portion of FIG. 3 below LOM≈10.5 should not be used. Moreover, the Delta Log R method is also known to work on coals except that that the calibration of $\Delta$ Log R to TOC will not be the same as for organic-rich shales. The coals are still easily recognized, but the Delta Log R method will under-predict TOC in a coal if the calibration of FIG. 3 is used—e.g., Delta Log R might predict TOC will be 20-30 wt %, whereas, the real TOC may be 60-80 wt %. Coal covers the entire maturity scale: LOM<1 is called peat; LOM in the range 1-4.5 is called lignite coal; LOM in the range 4.5-7 is called sub-bituminous coal; LOM in the range 7.5-13 is called bituminous coal; and LOM>13 is called anthracite coal. In the claims, the term hydrocarbon source rock potential will be understood to include coal potential.

For the example in FIG. 2, the maximum $\Delta$ Log R separation is approximately 0.7 of a logarithmic resistivity cycle (i.e. $\Delta$ Log R=0.7). If the LOM is 6-7, this can be seen from FIG. 3 to correspond to a TOC value of approximately 12%. In this manner, a TOC value depth profile may be calculated from FIGS. 2 and 3.

SUMMARY OF THE INVENTION

In one embodiment, with reference to the flow chart of FIG. 12, the invention is a method for remotely assessing hydrocarbon source rock potential of a subsurface region, comprising: (a) obtaining electromagnetic field data representative of the subsurface region from a survey conducted above the subsurface region (step 121); (b) obtaining reflection data from a surface seismic survey of the subsurface region (step 122—order relative to step 121 does not matter); (c) extracting a vertical profile of resistivity or its reciprocal, conductivity, from the electromagnetic data and a vertical profile of acoustic velocity or its reciprocal quantity, transit time, from the seismic reflection data, thus generating two profiles hereinafter called the resistivity profile and the transit time profile (step (123); and (d) evaluating depth intervals in the subsurface region for source rock potential based on differences between the two profiles and, optionally, on the character of the seismic reflection data (step 124). In practical applications of the invention, at least step (c) will be performed using a computer.

BRIEF DESCRIPTION OF THE DRAWINGS

The present invention and its advantages will be better understood by referring to the following detailed description and the attached drawing in which:

FIGS. 1A-C depict solid and fluid components in non-source and source rocks;

FIG. 2 is a schematic for interpretation of Delta Log R well log responses in a variety of subsurface formations;

Figure 3:
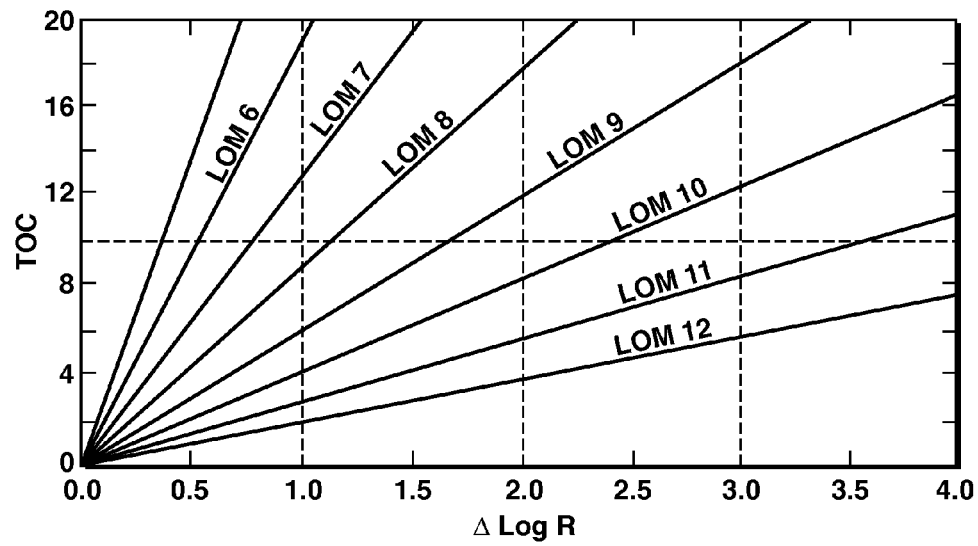
FIG. 3 shows calibration of TOC to LOM for the well-log-based Delta Log R diagram tool, as disclosed in Passey et al. supra.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF EXAMPLE EMBODIMENTS

The present invention extends the well known Delta Log R well-based method for estimating hydrocarbon source rock TOC, so that it is performed using seismic and electromagnetic geophysical data acquired remotely from the subsurface hydrocarbon source rock. Formation interval velocities derived from the seismic data, and formation resistivity data derived from the electromagnetic data (preferably controlled-source electromagnetic ("CSEM") survey data), are used instead of well log sonic and resistivity data from wells, respectively, to produce a new Remote Delta Log R (or "RDelta Log R") response. This new response is interpreted in conjunction with the overall character of the seismic reflection data (including continuity, geometry, and reflection amplitude) in cross-section, map, and volume views to further distinguish source rock from hydrocarbon reservoir rocks that can also exhibit an RDelta Log R response, and from fine-grained non-source rocks such as low TOC shales. The present inventive method uses the character in seismic reflection data of a target interval to differentiate potential organic-matter-rich rocks (ORRs) from potential hydrocarbon reservoir rocks, since both potential ORRs and hydrocarbon reservoirs have sonic-resistivity separation. Whereas $\Delta$ Log R uses only the local vertical P-wave (acoustic) velocity and horizontal resistivity as measured by borehole tools, and does not address anisotropy, the present inventive method transcends both of these limitations. Moreover, deriving the interval transit times from seismic data is significantly different from the directly measured sonic transit time in the borehole. Character in seismic reflection data includes the appearance of the thickness, continuity, geometry, and amplitude, along with their lateral rates of change of a target stratigraphic interval in cross-section, map, and volume views. To clarify terminology, organic rich rock (ORR) is the broadest term used to refer to the presence of organic carbon. Source rock is mature ORR. Potential source rock itself can be mature or immature. Mature source rock has evolved to the extent that hydrocarbons (oil or gas) have been produced, and they will be found either in the source rock interval or migrated to a nearby zone.

ORRs have distinctive impedance contrasts because of the influence of organic-matter (kerogen) content on seismic velocity and rock density that can contrast significantly with surrounding non-ORRs (such as organic-matter-poor mudstones, siltstones, sandstones, evaporites, or carbonates). The three-dimensional spatial distribution of their seismic character is a function of their depositional processes. They tend to have broadly distributive patterns, relatively low sediment accumulation rates, and relatively minor truncation and erosion, all indicating generally low levels of water bottom energy. Although ORRs may be relatively thin and may not always generate their own particular seismic response, they are associated with relatively thick intervals (100's of meters) of fine-grained rocks that share many of the same depositional attributes as the ORR interval. This contrasts sharply with the seismic character of coarse-grained stratal units that have more channelized patterns, relatively high sediment accumulation rates, and common occurrence of indicators of higher levels of water bottom energy, such as erosion and truncation.

In cross-section (vertical slice) view, the key characteristics include the continuity, geometry, and amplitude of seismic reflections, along with their lateral rates of change. ORRs tend to have seismic reflections that have broader lateral continuity, parallel to sub-parallel geometry and distinctive amplitudes that vary laterally at the kilometer to tens-of-kilometers scale. Amplitudes tend to be relatively high where ORRs are interbedded with carbonates, well-cemented mudstones, or coarse-grained clastics. Amplitudes tend to be relatively low, but laterally consistent where ORRs are interbedded with organic-matter-poor mudstones or claystones. At a sub-regional scale, ORRs tend to be associated with downlap and onlap surfaces.

In map or volume view, potential ORRs tend to have broadly distributive or tabular patterns, commonly draping pre-existing geometries or thickening into subsiding low areas. They tend to thin laterally at the kilometer to tens-of-kilometer scale, except where truncated by an erosional surface. In the absence of truncation, thinning of ORRs tends to be associated with downlap or onlap geometric relations in reflection seismic data, but may result in a more pronounced seismic reflector due to concentration or amalgamation of organic matter. Coarse-grained reservoir-prone strata are distinguished by their generally channelized to narrowly distributive patterns, abrupt lateral changes in thickness, and common lateral termination by onlap or truncation.

An advantage of the present inventive method is that it does not need well data from the exploration area of interest. However, if well data are available from another geologically similar area that can be extrapolated to the exploration area, including density log data, that can optionally be used to help calibrate the RDelta Log R method in the exploration area. A brief background summary of typical seismic and electromagnetic survey methods follows next.

Seismic Methods

Figure 5A:
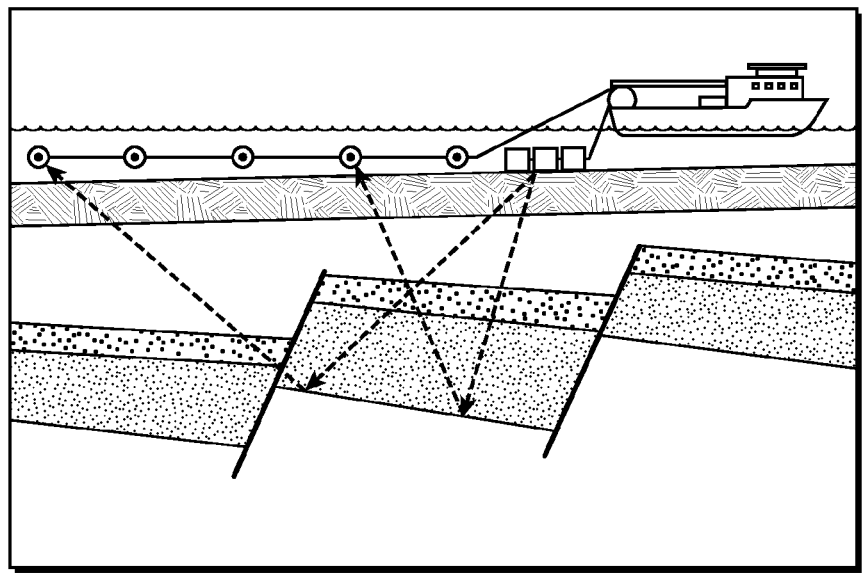
FIGS. 5A-B illustrate typical marine (A) and land (B) seismic data acquisition for subsurface geologic imaging and interval velocity determination.
Figure 5B:
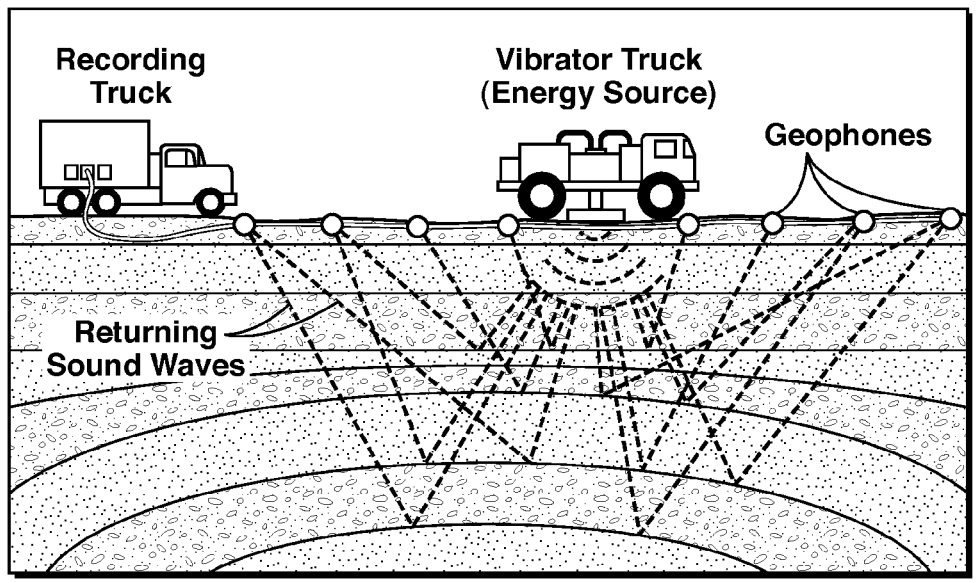

The seismic reflection method is the dominant technique for imaging geologic structure and stratigraphy within the earth, and estimating rock and fluid properties for the hydrocarbon industry. A large body of published literature describes this established seismic method and its applications, well known to practitioners of the geophysical art. Depictions of typical examples of the seismic reflection data acquisition method used both in a body of water and on land, are shown in FIGS. 5A (water) and 5B (land). In FIG. 5A, a ship tows a seismic source followed by a streamer of seismic receivers. In the land example shown in FIG. 5A, a vibrator source is being used, and a string of geophone receivers is shown, electrically connected to a recording truck. In both drawings, example raypaths are shown reflecting from subsurface interfaces, back up to the surface where they are recorded along with their arrival times. A critical aspect of the seismic method is determination of subsurface physical velocities associated with the propagation speeds of P and S-waves in the geologic formations. Seismic velocity estimation is essential for summing (or "stacking") data from an ensemble of receiver measurements made at different source-to-receiver distances, so as to construct an image of the reflection point in the subsurface from more than a single recording position. Many methods have been developed over the past 90 years or so and are now used for velocity estimation, including normal-move-out analysis of seismic reflection pre-stack ensemble ("gathered") responses, seismic reflection and refraction tomography, and seismic wave focusing (imaging) during data migration that repositions reflections and diffractions to their correct subsurface locations. A general survey of such known methods may be found in *Interval Velocities from Seismic Reflection Time Measurements* by Hubral, SEG, Tulsa, 203 pages (1980). The simplest method for estimating P-wave speeds in flat subsurface layers, or determining "interval velocities", is the Dix approximation (Dix, "Seismic Velocities From Surface Measurements," *Geophysics* 20, 68-86 (1955)).

Equally important is the need to combine data of different source-to-receiver offsets, since seismic data are much like "echoes" that are measured as arrival events in terms of their total travel time (in seconds) from source to receiver, the true depth structure of the earth is not known (i.e. wave travel time converted to depth) until the subsurface seismic velocities are estimated or directly measured. Velocity estimation methods for depth conversion are summarized by Harlan et al. ("Introduction to the Supplement on Velocity Estimation for Depth Imaging," *Geophysics* 73, pp. VE1-VE3 (2008). In many cases, the subsurface velocities depend upon the direction of propagation of the waves, which effect is called anisotropy. In most cases this seismic velocity is roughly uniform in all horizontal directions, but is smaller in the vertical direction. Such anisotropy is called vertically transverse isotropy (VTI), or simply vertical anisotropy. This further complicates the velocity estimation problem, but methods have been developed to account for the effect. See, for example, Alkhalifah and Tsvankin, "Velocity Analysis for Transversely Isotropic Media," *Geophysics* 60, 1550-1556 (1995). Most methods used for seismic interval velocity estimation produce values for the horizontal component of the velocity. Estimates of vertical seismic interval velocity are obtained in a number of ways, ranging from simple scaling of the vertical value from the horizontal measured value, to complex imaging techniques such as anisotropic migration and anisotropic inversion.

Even if a well bore is available in the area of the survey, in which the velocity of seismic waves (using the vertical P-wave value, from sonic transit time log data) are measured locally using a well logging device, velocity estimation for the whole area can be difficult and will contain uncertainties. For the purposes of the present invention, a variety of seismic velocity estimation methods may be used. Preferred methods are those that are most sensitive to variations in TOC, and that produce the highest accuracy and spatial resolution for a given area which in turn will depend on the seismic data quality and the complexity of the geology.

A number of seismic forward- and inverse-modeling methods are available for determining density and either velocities or acoustic moduli from seismic data. See for example: Tarantola, "Inversion of Seismic Reflection Data in the Acoustic Approximation," *Geophysics* 49, 1259-1266 (1984); Carazzone 1986, "Inversion of P-SV Seismic Data, *Geophysics*" 51, 1056-1068 (1986); Symes and Carazzone, "Velocity Inversion by Differential Semblance Optimization," *Geophysics* 56, 654-663 (1991); Squires et al., "The Effects of Statics on Tomographic Velocity Reconstructions," *Geophysics* 57, 353-363 (1992); and Stoffa and Sen, "Nonlinear Multiparameter Optimization Using Genetic Algorithms: Inversion of Plane-Wave Seismograms," *Geophysics* 56 1794-1810 (1991). Seismic velocity and density estimates are then combined to estimate porosity, either using rock physics models or using mathematical inversion. It is important to note that the vertical resolution of seismic velocities is typically much less than the vertical spacing of individual reflectors (reflector resolution is theoretically ¼th of a vertical wavelength), since velocity information is contained mostly in the varying times of reflection arrivals in the multiple-trace ensemble ("gather") of responses, which is a low-frequency measurement. New techniques that attempt to mathematically invert the full waveforms of the seismic data in order to estimate velocities and densities at the highest possible resolution and accuracy may overcome this velocity resolution limitation (Singh et al., "Full Elastic Waveform Inversion: Future of Quantitative Seismic Imaging," 78th Annual International Meeting, SEG *Expanded Abstracts*, (2008)).

Limited attempts have been made to identify source rocks directly from attributes of seismic reflection pre-stack responses. For example, theoretical and 1D model studies of an ideal isolated source rock layer imbedded in a uniform isotropic half-space suggest that the organic content of the source rock could be obtained from amplitude-versus offset (AVO) analysis of seismic primary (P-wave) and converted wave (P-wave to S-(shear) wave)) reflections, at least for TOC>10%; see Carcione, "AVO Effects of a Hydrocarbon Source-Rock Layer," *Geophysics* 66, 419-427 (2001). However, Carcione's theoretical method contains considerable ambiguity (trade-off) between kerogen content and hydrocarbon source layer thickness. In addition, the complexity and spatial variations of physical parameters in the real subsurface makes the interpretation of such coupled P- and S-wave AVO effects highly problematic for determining source rock properties. Carcione's method is not known to be used in the source rock determination art. Other references include Vernick and Nur, "Ultrasonic Velocity and Anisotropy of Hydrocarbon Source Rocks," *Geophysics* 57, 727-735 (1992); and Meyer and Nederlof, "Identification of Source Rocks on Wireline Logs by Density/Resistivity and Sonic Transit Time/Resistivity Crossplots," *AAPG Bulletin* 68, 121-129 (1984).

Electromagnetic Geophysical Methods

Figure 6:
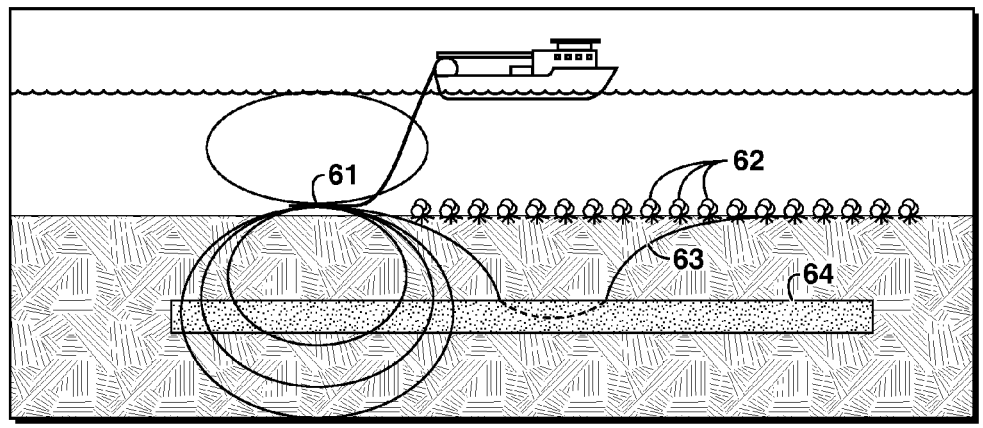
FIG. 6 depicts marine controlled-source electromagnetic (CSEM) data acquisition for subsurface resistivity determination.

Both natural-source (such as magnetotellurics) and controlled-source electromagnetic methods have been used in hydrocarbon exploration since early in the 20th century. Recent advances in electromagnetic geophysical methods, especially marine controlled-source electromagnetics (CSEM), make it possible to remotely measure the bulk horizontal and vertical electrical resistivity of subsurface formations with considerable accuracy but at fairly low vertical resolution, typically 5-10% of the depth below the surface (Ellingsrud et al., "Remote Sensing of Hydrocarbon Layers by Seabed Logging (SBL): Results From a Cruise Offshore Angola," *The Leading Edge* 21, 972-982 (2002); Srnka et al., "Remote Reservoir Resistivity Mapping—an Overview," *The Leading Edge* 25, 972-975 (2006); Jing et al., "CSEM Inversion: Impact of Anisotropy, Data Coverage, and Initial Models", 78th Annual International Meeting, SEG, *Expanded Abstracts* (2008). CSEM surveying has become an important geophysical tool for evaluating the presence of hydrocarbon-bearing reservoirs within the earth (Constable and Srnka, "An Introduction to Marine Controlled-Source Electromagnetic Methods for Hydrocarbon Exploration," *Geophysics* 72, pp. WA3-12 (2007)). In this method a controlled electromagnetic transmitter is towed above or positioned between electromagnetic receivers on the seafloor, such as disclosed in U.S. Pat. No. 6,603,313 to Srnka and PCT Patent Application Publication WO 2004/083898 by Eidesmo et al. FIG. 6 illustrates the controlled-source electromagnetic data acquisition method in a body of water. The vessel is shown towing an electromagnetic source such as a horizontal electrical dipole 61. Receivers 62 are placed on the seafloor. The source emits a low frequency current signal that penetrates below the water bottom as indicated in the drawing, A signal path 63 is shown traversing a hydrocarbon-bearing layer 64, which will be characterized by elevated electrical resistivity, and then being detected by the receivers.

Frequency-domain mathematical inversion is used by practitioners of the geophysical art to estimate subsurface resistivity values from CSEM data (Carazzone, "Three Dimensional Imaging of Marine CSEM Data," 75th Annual International meeting, *SEG Expanded Abstracts*, (2005); and MacGregor, et al., "De-Risking Exploration Prospects Using Integrated Seismic and Electromagnetic Data—a Falkland Islands Case Study," *The Leading Edge* 26, 356-359 (2007)), particularly in offshore CSEM surveys in deep water.

The method is useful because it produces resistivity models of the subsurface consistent with measured data, generally amplitude and phase of one or more measured components of the electric field at one or more frequencies for an array of receivers. One-dimensional ("1D"), 2D, and 3D inversions of Maxwell's equations can be performed using a high-performance computer (usually with massively parallel architecture) to generate 1D resistivity profiles, 2D resistivity swaths, and/or 3D resistivity volumes (respectively). In some cases, it may be desirable to obtain and incorporate measurements of the CSEM magnetic fields as well as natural-source electromagnetic data, such as magnetotelluric data, in the inversion together with the CSEM data. The inversion of magnetotelluric data has been discussed by, for example, Newman and Alumbaugh, "Three-Dimensional Magnetotelluric Inversion Using Non-Linear Conjugate Gradients," *Geophysical Journal International* 140, 410-424 (2000).

Similar to the seismic case, the electrical resistivity of the subsurface is generally anisotropic or dependent on direction of the current (or signal). In most cases the resistivity is roughly uniform in all horizontal directions, so there is no azimuthally dependent anisotropy, but the resistivity is typically larger in the vertical direction. Such anisotropy is called vertically transverse isotropy (VTI). The impact of anisotropy on CSEM and magnetotelluric data have been discussed by Jupp and Vozoff, "Resolving Anisotropy in Layered Media by Joint Inversion," *Geophysical Prospecting* 25, 460-470 (1977), and by Lu and Xia, "Understanding Anisotropy in Marine CSEM Data," 77th Annual International Meeting, SEG, *Expanded Abstracts*, 633-637 (2007). The inversion of surface electromagnetic data for anisotropic resistivities has been discussed by Jing et al., "CSEM Inversion: Impact of Anisotropy, Data Coverage, and Initial Models," 78th Annual International Meeting, *SEG, Expanded Abstracts* (2008). The earth may be equivalently characterized by resistivity or its inverse, electrical conductivity.

Increased TOC due to kerogen in mature (i.e., hydrocarbon bearing) source rocks (typically shales) is known to increase the horizontal electrical resistivity of the rock (i.e. parallel to the bedding planes), for example as measured by conventional wireline or Logging-While-Drilling (LWD) or Measurement-While-Drilling (MWD) well logging tools. Increases in the vertical resistivity of the formation may be even more diagnostic of a high-LOM (mature) source rock than the horizontal resistivity values used in the standard Delta Log R well log technique. This arises from the fact that shales are typically composed of fine layers or lamina containing clay particles aligned approximately horizontally to the bedding plane, so that the resistivity normal to (across) the lamina is higher than that aligned with the lamina Therefore a method for measuring both horizontal and vertical subsurface resistivity would be advantageous for determining source rock electrical properties.

Figure 4:
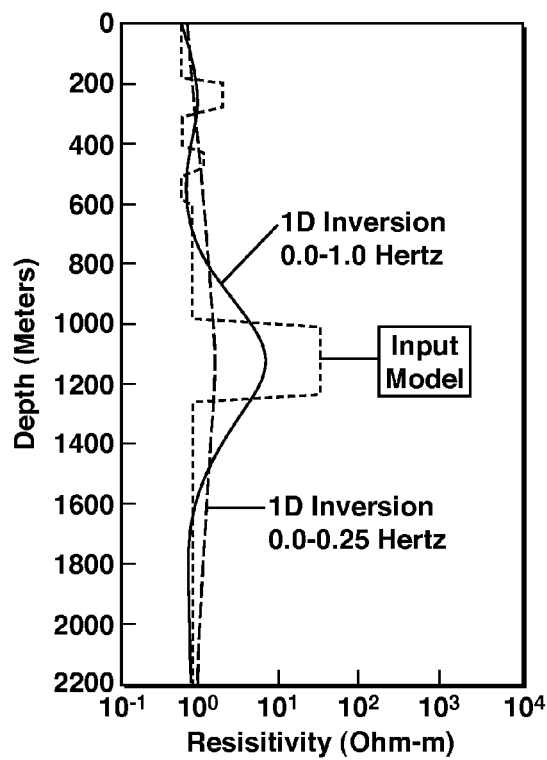
FIG. 4 shows vertical accuracy and spatial resolution of a model 1D resistivity profile, at two inversion bandwidths (0.0-0.25 Hertz and 0.0-1.0 Hertz)

When mathematical inversion is used to analyze electromagnetic data, thin (i.e. tens of meters thick), moderately resistive (i.e. 10 to 100 Ohm-m) geological bodies appear in the resultant subsurface resistivity images as spread-out or vertically diffuse (i.e., hundreds of meters thick), that are less resistive (i.e. 1 to 10 Ohm-m) bodies than the actual subsurface bodies. This is due in part to the low temporal frequencies required for surface electromagnetic data to penetrate significant distances into the earth (the electromagnetic skin-depth effect), and also to the resulting limited vertical and spatial resolution (Hohmann and Raiche, Chapter 8—Inversion of Controlled-Source Electromagnetic Data, in *Electromagnetic Methods in Applied Geophysics—Theory*, 1, SEG, 469-504 (1987)). Electromagnetic wavelengths in the subsurface are generally ten times longer than seismic wavelengths at the same frequency, so the vertical electromagnetic resolution is generally much lower than the vertical seismic resolution. Because of this inherent low resolution, unconstrained electromagnetic inversion algorithms cannot produce resistivity images with sharp boundaries or recover true values of subsurface resistivity. FIG. 4 demonstrates this using 1D frequency-domain inversion of a model resistivity structure, for two ranges of input data frequencies, 0.0 to 0.25 Hertz and 0.0 to 1.0 Hertz. Further limitations on resolution arise from the fact that the measured data are limited by background noises, and are limited in area coverage by cost and time considerations. Both the horizontal and vertical resistivity are estimated in anisotropic inversion methods applied to CSEM and combined CSEM and MT data; see Jing et al., 2008, op. cit., which is incorporated herein by reference.

The true subsurface resistivity and/or thickness of a geologic body imaged using electromagnetic geophysical methods can be estimated by scaling the resistivity-thickness product (transverse resistivity) of the low-resolution (vertically de-focused) resistive body to that of an equivalent thin body using the well-known equations for conservation of resistive-thickness, $t_1 * \rho_1 = t_2 * \rho_2$. (Harris and MacGregor, "Enhancing the Resolution of CSEM Inversion Using Seismic Constraints," 77th Annual International meeting, *SEG Expanded Abstracts*, (2007)). Much theoretical work and early demonstrations of CSEM imaging focused on this problem, for example the response of a single isolated hydrocarbon reservoir in a conductive background. See, for example, PCT Patent Application Publication WO 2004/083898 by Eidesmo et al; Weiss and Constable, "Mapping Thin Resistors and Hydrocarbons With Marine EM Methods, Part II—Modeling and Analysis in 3D," *Geophysics* 71, 321-332 (2006); and Um and Alumbaugh, "On the Physics of the Marine Controlled-Source Electromagnetic Method," *Geophysics* 72, pp. WA13-WA26 (2007).

In addition to separate electromagnetic and seismic inversions, techniques for the joint (simultaneous) inversion of electromagnetic and seismic geophysical data are being developed. See for example Hou et al., "Reservoir-Parameter Identification Using Minimum Relative Entropy-Based Bayesian Inversion of Seismic AVA and Marine CSEM Data," *Geophysics* 71, pp. 077-088 (2006); Hoversten et al., "Direct Reservoir Parameter Estimation Using Joint Inversion of Marine Seismic AVA and CSEM Data", *Geophysics* 71, pp. C1-C13 (2006); and Chen and Dickens, "Effects of Uncertainty in Rock-Physics Models on Reservoir Parameter Estimation Using Marine Seismic AVA and CSEM Data," 77th Annual International Meeting, *SEG Expanded Abstracts*, 457-461 (2007). Such joint inversion methods may be able to provide estimates of subsurface seismic interval velocity and resistivity at the resolution of the seismic data, and are incorporated herein by reference. In one detailed, preferred embodiment, the invention consists of the following steps, in three groupings. A more general statement of the invention with more basic steps is provided in the Summary of Invention section.

A. Seismic Steps
1. Obtaining measured surface seismic data characteristic of the earth's subsurface velocity structure;
2. Generating one or more acoustic (P-wave) and shear (S-vertical and S-horizontal wave) horizontal and vertical seismic interval velocity images of the subsurface from the seismic data;
3. Extracting vertical profiles of horizontal and vertical acoustic and shear interval velocity for at least one surface location from the seismic velocity images;
4. Converting the vertical profiles of horizontal and vertical acoustic and shear velocity into pseudo-transit-time sonic logs (the pseudo aspect will hereinafter be understood) by forming the mathematical reciprocal of the interval velocity, that is, a 10,000 feet/second seismic horizontal acoustic interval velocity is converted to 100 microseconds/foot (100 μsec/ft) interval transit time;
5. Obtaining one or more images of the subsurface geologic structure and stratigraphy from the surface seismic data;
6. Interpreting the character and geometry of the subsurface geologic structure and stratigraphy, and interpreting quantitative attributes of the seismic data, for the presence of fine-grain non-source rock intervals and the candidate source rock intervals;

B. Electromagnetic Steps
1. Obtaining measured surface electromagnetic data characteristic of the earth's subsurface vertical and horizontal electrical resistivity, preferably controlled-source electromagnetic (CSEM) data but also including natural-source electromagnetic data such as magnetotellurics (MT);
2. Generating one or more 3D images (volumes) of horizontal and vertical resistivity of the subsurface;
3. Extracting vertical profiles of horizontal and vertical resistivity for at least one surface location from the electromagnetic data image volumes;

C. Source Rock Characteristics Steps
1. Mathematically scaling the horizontal and vertical seismic transit time profiles and the horizontal and vertical resistivity profiles for purposes of interpretability, for example such that −100 μsec/ft corresponds to two logarithmic (log base 10, or Log 10) cycles (excursions) in the resistivity profile;
2. Overlaying the resistivity profiles and the pseudo-sonic interval seismic profiles such that they are base-lined in the interpreted non-source fine-grained rock interval. The baseline is defined such that the two types of curves directly overlie (track) each other over a significant depth range;
3. Interpreting the relative separation and non-parallelism of the two types of curves in terms of organic-rich intervals;
4. Estimating TOC and LOM for the interpreted source rock intervals using the well-log-based Delta Log R diagram tool, well known to practitioners of the art; and
5. Finally, if well log information is available from nearby areas or distant geologically analogous areas appropriate to the depth range of interest, calibrating the interpretation of the remotely determined characteristics of interpreted source rock intervals using the available well log information.

The seismic grouping steps may be performed before or after the electromagnetic grouping steps. The source rock characteristics grouping steps are performed after both the seismic and electromagnetic steps have been performed.

The scaling step and the baseline step differ as follows. The correct relative scaling of the time transit curve and the resistivity curve is known to be controlled in water-bearing shales by physical law. Empirical relationships such as Archie's Equation capture this relationship. Archie's equation relates porosity to resistivity (and water saturation), but acoustic velocity also depends on porosity. Thus physics dictates the correct relative scaling, which is that 1 log cycle of resistivity correspond approximately to 50 μs/ft (164 μs/m) of transit time. A theoretical basis for this particular relative scaling in water-filled, non-organic-rich shales is provided in the Appendix in Passey et al., supra, which is incorporated herein by reference. However, this is not the only scaling possible in the present invention or in well-based Δ logR. The 50:1 relationship proposed and used in Passey et al. (1990) supra is a linear approximation to a more complex physical relationship for water-filled porosity, but appears to be adequate for organic-rich shales that are in the oil-generation window, i.e., rocks that have been buried deep enough to be physically compacted, and subjected to sufficient time-temperature that the organic-matter has begun to generate hydrocarbons. Recent studies of "shale gas" reservoirs worldwide indicate that the 50:1 scaling is still appropriate for organic-rich rocks that are "over mature", meaning that oil-prone source rocks are higher maturity than for oil-generation, and that these same organic-rich rocks are now generating gas. The 50:1 scaling was a convenient approximation before the advent of high-speed digital computers, because it allowed the technique to be performed using standard well log scales available at the wellsite. The 50:1 ratio was not based on any sensitivity study suggesting that 50:1 is better than 45:1, or 55:1, or 60:1. Thus, the 50:1 scaling is a good approximation of a more complex relationship, which approximation is also very convenient and easily adopted to use. As outlined in the Appendix of the Passey et al. 1990 paper (FIG. 18 of that paper), the authors recognized that for very shallow marine sediments (i.e., those not yet "compacted"), the 50:1 scaling is not appropriate (the relationship would be more like 20:1); similarly, for tight (low porosity) cemented intervals (which are not likely to be organic-rich source rocks), a more appropriate scaling would be 70:1 or thereabouts. But both of these scenarios are not likely to be where mature organic-rich shales are expected to be found. The present inventive method is certainly not limited to 50:1 scaling. Herein, the term "source rock" or "hydrocarbon source rock" includes source rock of all levels of maturity.

Baselining, on the other hand, is shifting (relative to each other) the zero points of the two amplitude scales so that the two curves lie one on top of the other in depth intervals where no source rock is present. See zones A and E in FIG. 2 for examples of baselining. Such alignment is useful for helping recognition and quantitative assessment of intervals where source rock is present via contrasting separation between the two profiles. See zones B, C and F in FIG. 2 for examples of that. Although, scaling and baselining are used in preferred embodiments of the invention, neither is required. Any technique that compares a velocity-derived profile with a resistivity-derived profile and enables identification and classification of dissimilarities may be used. Further regarding baselining, approximately 70% of all sedimentary rocks are shale, and of the shale, approximately 90-95% is non-organic rich. Thus it will be readily apparent to the user of the invention which depth ranges should be used for baselining. However, a single baselining may not be best in all situations depending upon how the geology changes with depth. In such cases, two or more different depth ranges might each be given separate baselinings. For example, the baseline may shift when the geology changes from shale or clay to carbonate or marl.

It will be readily appreciated that the Delta Log R diagram tool such as FIG. 2 may use velocity directly as one scaled, baselined quantity, rather than computing the inverse of velocity to get transit time. In such case, if the velocity scale increases in the reverse direction from the ΔT scale shown in FIG. 2, then the qualitative nature of the diagram is maintained, and the quantitative nature of the method is also maintained by appropriately converting the 50:1 (or whatever other ratio may be used) scaling. In a similar manner, conductivity may be the electrical property used instead of its reciprocal, resistivity. All such variations shall be deemed to be within the scope of the attached claims.

The RDelta Log R response may be formed using any of the four seismic interval transit times (reciprocated from their four respective seismic velocities) that exist within a vertically transversely-isotropic (VTI) section of rock, namely:

(1) Horizontal acoustic (P-wave) transit time,
(2) Vertical acoustic (P-wave) transit time,
(3) Horizontal Shear-(Sh-wave) transit time,
(4) Vertical Shear (Sv-wave) transit time, that are appropriately scaled, overlain, and baselined as described previously (above) to the two interval resistivities: horizontal resistivity and vertical resistivity. There are thus eight combinations of seismic interval transit time and interval resistivity that define different embodiments or variations of the present invention, which may be called the Remote Delta Log R ("RDelta Log R") method. Each combination of transit time and resistivity (such as vertical acoustic transit time overlaid with vertical resistivity) generally shows a different RDelta Log R response, depending upon the rock type and pore content. Next, it is shown how to estimate sensitivity of TOC to each of the eight combinations by model calculations, and thereby make an optimal choice of which combination to use.

Figure 7:
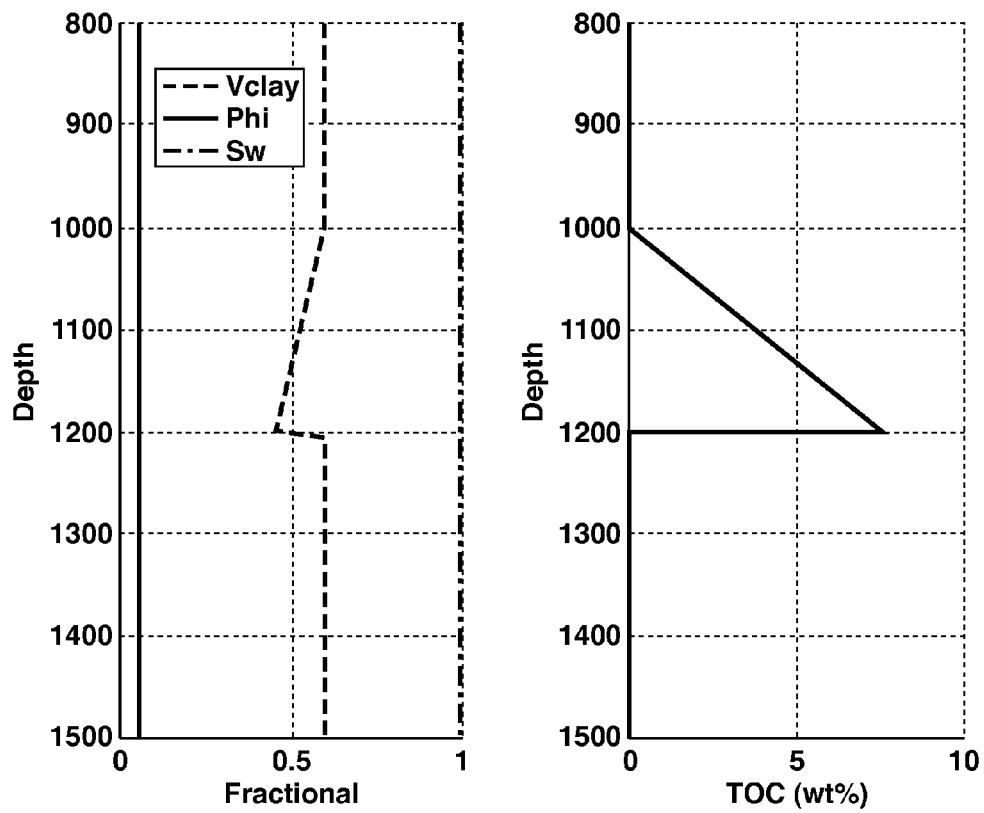
FIG. 7 shows an anisotropic (VTI) shale (clay-sand) model containing depth-dependent TOC.

FIG. 7 depicts the input model for a theoretical calculation of the effects of varying TOC on electrical resistivity and seismic velocity for a VTI shale (i.e. a clay-sand mixture) having uniform porosity PHI=5.0% and water saturation (100%), but a total organic carbon content (TOC) increasing from 0% to 7.5% (weight percent) over the depth interval of 1000 to 1200 feet using a modified Xu-White numerical rock physics model (Xu, S. and White, R. E., "A New Velocity Model for Clay-Sand Mixtures," Geophys. Prosp. 43, 91-118 (1995); and Key, R. G. and Xu, S., "An Approximation for the Xu-White Velocity Model," Geophysics 67, 1406-1414 (2002)).

Figure 8A:
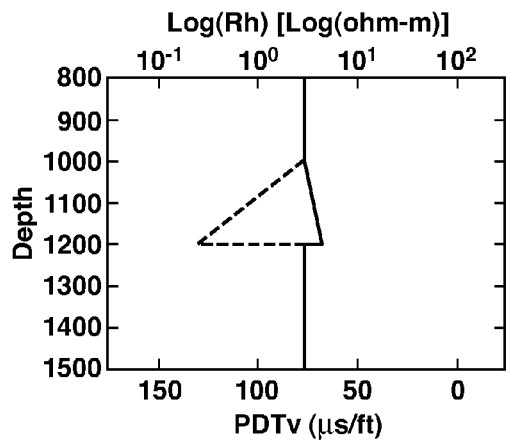
FIGS. 8A-D depict the changes in P-wave vertical and horizontal interval transit times (reciprocal velocities), and the horizontal and vertical resistivities, as TOC is varied using the VTI rock model shown in FIG. 7.
Figure 8B:
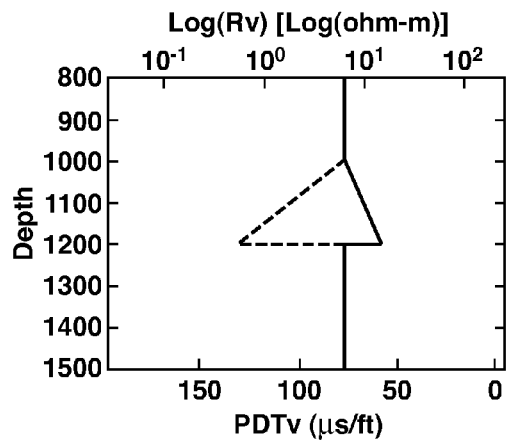
Figure 8C:
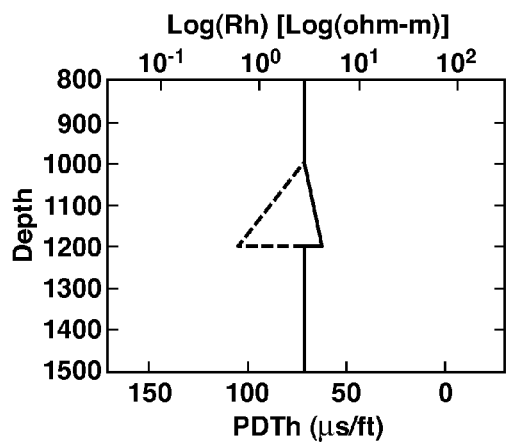
Figure 8D:
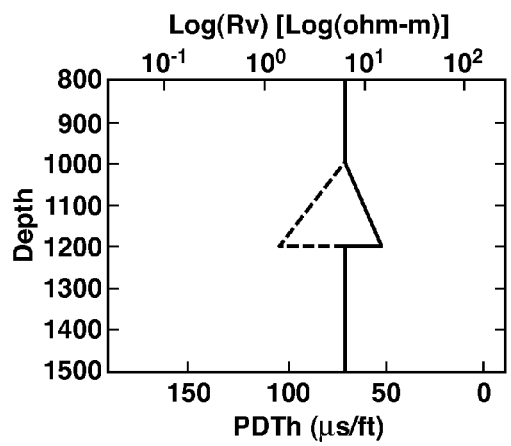
Figure 9A:
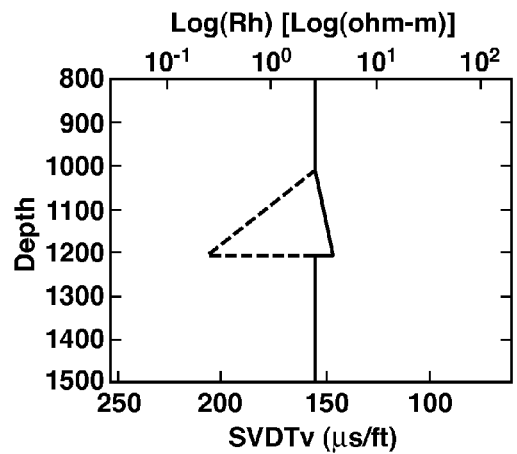
FIGS. 9A-D depict the changes in shear-vertical (Sv-wave) vertical and horizontal interval transit times (reciprocal velocities), and the horizontal and vertical resistivities, as TOC is varied using the VTI rock model shown in FIG. 7.
Figure 9B:
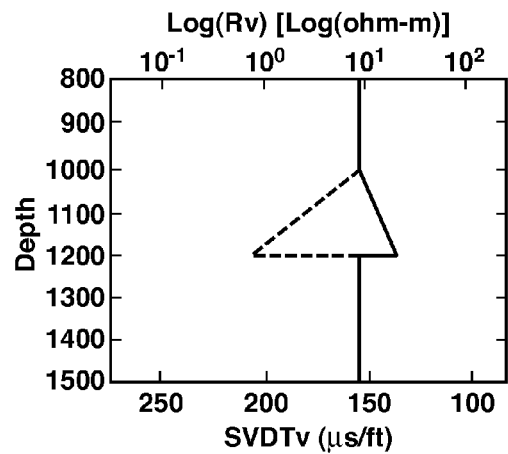
Figure 9C:
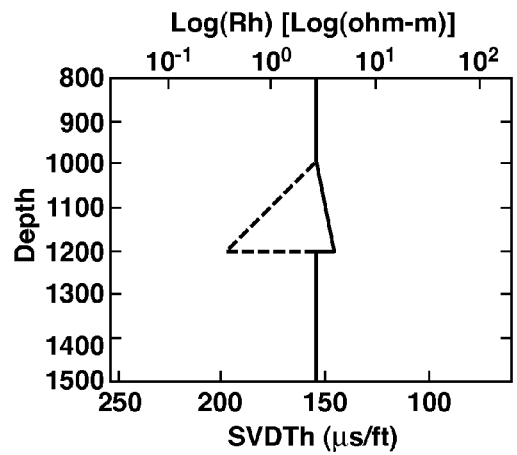
Figure 9D:
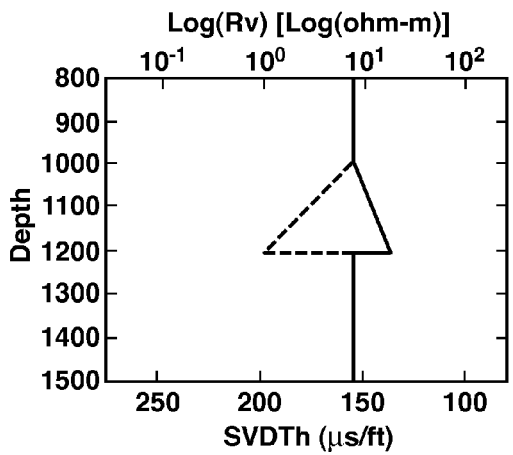
Figure 10A:
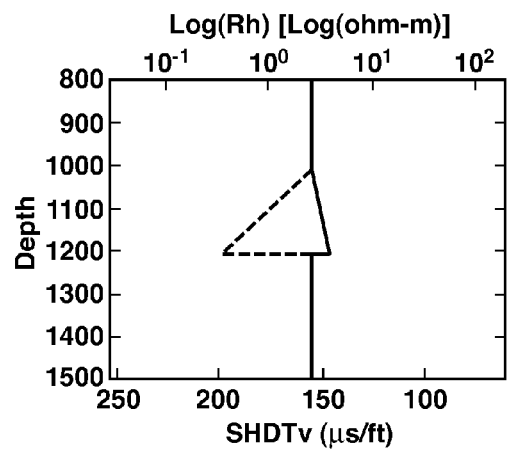
FIGS. 10A-D depict the changes in shear-horizontal (Sh-wave) vertical and horizontal interval transit times (reciprocal velocities), and the horizontal and vertical resistivities, as TOC is varied using the VTI rock model shown in FIG. 7.
Figure 10B:
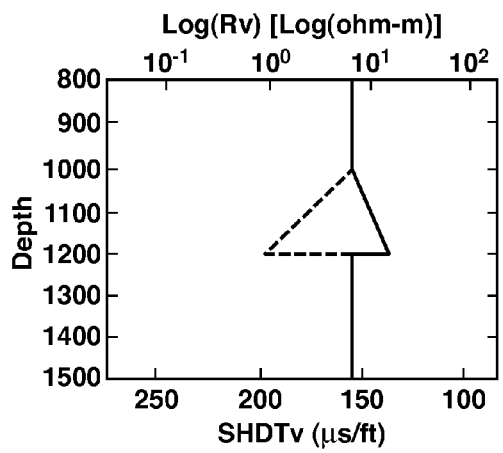
Figure 10C:
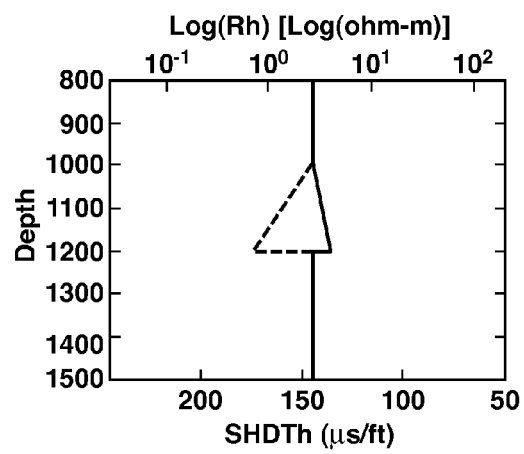
Figure 10D:
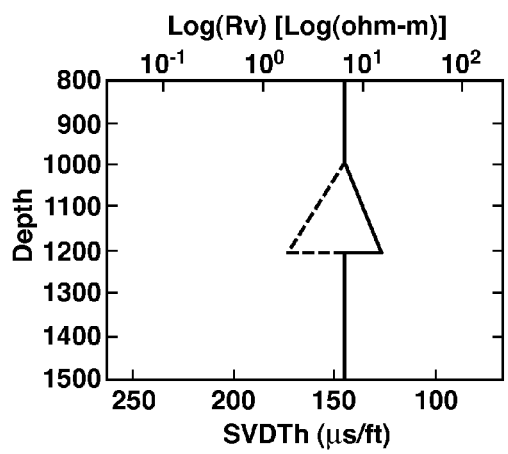

FIGS. 8A-D show the calculated changes in vertical P-wave (acoustic) interval transit-time PDTv (8A-B) and horizontal interval transit time PDTh (8C-D) in units of microseconds per foot, and the calculated changes in vertical (8B and 8D) and horizontal (8A and 8C) resistivity in units of Ohm-meters, (logarithmic scale) as TOC increases with depth in the model of FIG. 7. The largest calculated Δ Log R separations are for the combination of vertical P-wave transit time and vertical resistivity (FIG. 8B). In this modeled shale, this is the combination of transit-time and resistivity derived from the surface seismic and CSEM data respectively that would give the optimal RDelta Log R response.

FIGS. 9A-D show the calculated changes in shear-vertical (Sy-wave) vertical SVDTv (9A-B) and Sy-wave horizontal SVDTh (9C-D) interval transit-times in units of microseconds per foot, and the calculated changes in vertical (9B, 9D) and horizontal (9A, 9C) resistivity in units of Ohm-meters, (logarithmic scale) as TOC increases with depth in the model of FIG. 7. The calculated interval transit-time changes are the same for Sy-wave vertical (SVDTv) and Sy-wave horizontal (SVDTh) modes interval. A combination of either of these transit-time changes with the vertical resistivity changes (FIGS. 9B and 9D), give the largest Delta Log R response for the Sy-wave. However, both of these responses are smaller in magnitude than the combination of vertical P-wave transit-time and vertical resistivity (FIG. 8B).

FIGS. 10A-D show the calculated changes in shear-horizontal (Sh-wave) vertical SHDTv (10A-B) and Sh-wave horizontal SHDTh (10C-D) interval transit-times in units of microseconds per foot, and the calculated changes in vertical (10B, 10D) and horizontal (10A, 10C) resistivity in units of Ohm-meters, (logarithmic scale) as TOC increases with depth in the model of FIG. 7. The calculated interval transit-time change for Sh-wave vertical (SHDTv) combined with the vertical resistivity change (FIG. 10B), gives the largest Delta Log R response for the Sh-wave. However, this response is smaller in magnitude than the combination of vertical P-wave transit-time and vertical resistivity (FIG. 8B).

Figure 11:
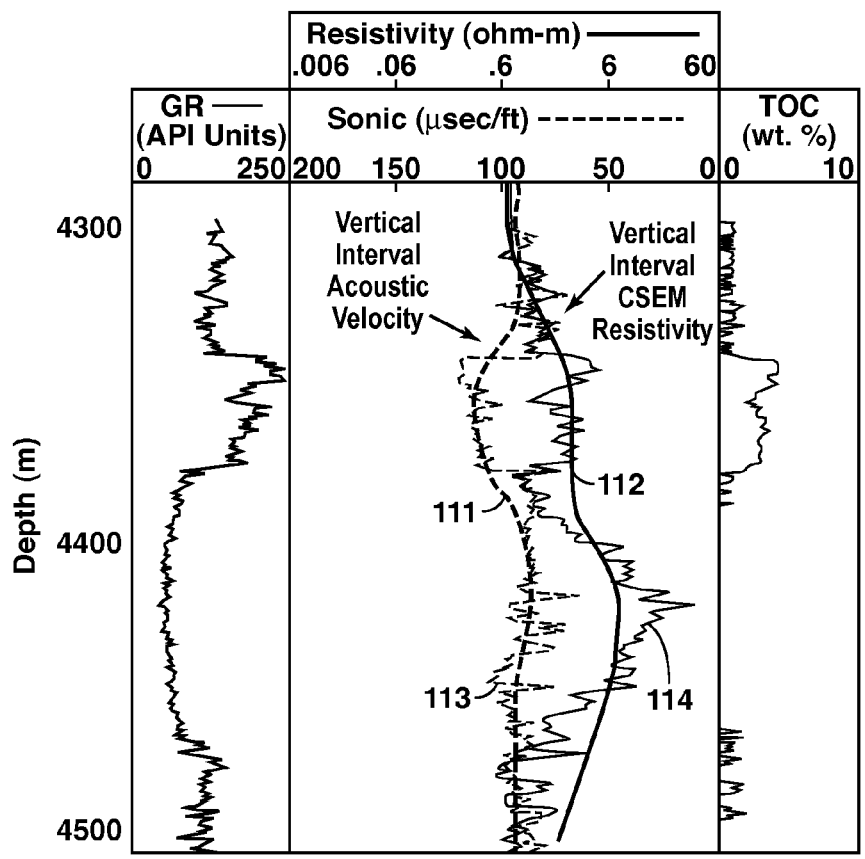
FIG. 11 is a schematic diagram of Remote Delta Log R response from seismic and remote resistivity data, compared with Delta Log R from well logs.
Figure 12:
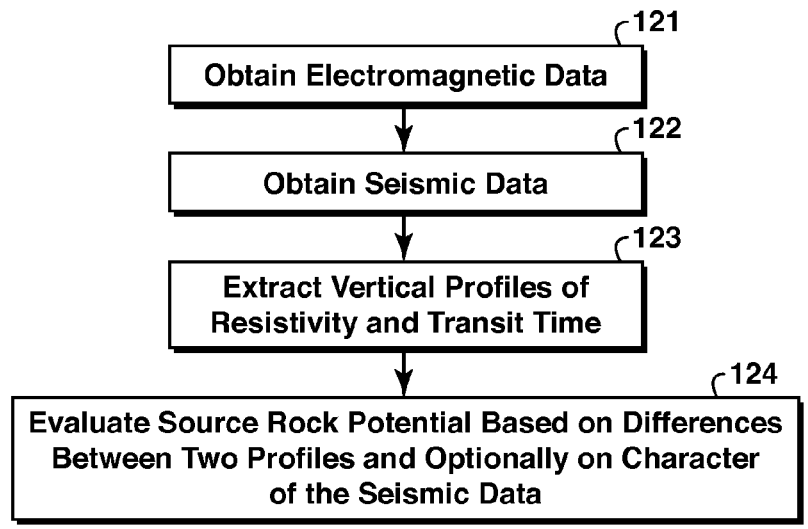
FIG. 12 is a flow chart showing basic steps in one embodiment of the present inventive method.

FIG. 11 shows the modeled RDelta Log R response for the combination of vertical resistivity and vertical acoustic (seismic P-wave) transit time, in a clastic rock (sands and shales) interval over approximately a 215 meter depth range, compared with the conventional well-based Delta Log R response for the same interval. (For reference, FIG. 11 also includes a gamma ray log on the left and a TOC profile on the right that was derived from the well log data using the Delta Log R method.) The RDelta Log R profiles are the smooth curves 111 (transit time) and 112 (resistivity), whereas 113 is the sonic log and 114 the resistivity log. Although simulated in the example of FIG. 11, in actual practice, the horizontal resistivity data may be obtained from 3D cell-based (e.g. finite-difference) frequency-domain nonlinear inversion of a marine CSEM data set (see. M. Commer et al., "Massively Parallel Electrical-Conductivity Imaging of Hydrocarbons Using the IBM Blue Gene/L Supercomputer," IBM Journal of Research and Development 52, 93-104 (2008)), applied without explicit constraints on thickness or resistivity values. It will be understood by practitioners of electromagnetic modeling that such a characterization might be refined or re-sampled in order to improve the solution of Maxwell's equations at different frequencies. Alternative parameterizations are possible, and some may be more suitable for the solution of Maxwell's equations such as by the method of finite elements or by integral equation methods, or using time-domain rather than frequency-domain approaches, all of which are well known in the technical field. In any event, all such parameterizations will be equivalent to a cell-based parameterization suitable for interpreting resistivity images.

Whereas full-physics, nonlinearly inverted, multicomponent CSEM volumes are preferred for generating subsurface resistivity images, 3D iterative forward CSEM modeling (Green, et al., "R3M Case Studies: Detecting Reservoir Resistivity in Complex Settings," 75th Annual International Meeting, *SEG Extended Abstracts* (2005)) can also be used to generate the subsurface resistivity images. When resistivity images are derived from electromagnetic data that have incomplete area coverage, or are lacking in some data aspect such as frequency content or electromagnetic data components, 2D or 2.5D inverted resistivity images can be used in the invention but these in general have lower accuracy and spatial resolution than the preferred 3D full-physics approach.

The simulated vertical seismic P-wave interval velocity (reciprocal transit time) depicted in FIG. 11 would in practice preferably be derived from a 3D pre-stack acoustic anisotropic depth migration of a reflection data set. Alternatively, prestack elastic anisotropic depth migration may be applied to the seismic data in place of the acoustic method, although elastic anisotropic depth migration is more time-consuming and costly. Because of the much lower vertical resolution of the seismic and CSEM data as described previously herein, both the vertical resolution and the accuracy of the RDelta Log R response are less than that obtained using the well-based Delta Log R method, as can be seen from FIG. 11. However, the remotely derived RDelta Log R response correctly identifies the source rock interval, located above the reservoir interval. It is noted that resistivity responds mostly to pore fluids, including bulk volume water. The bulk volume water (BVW) is a function of the porosity (void space) and water saturation (Sw %) within the pore space, i.e. BVW=porosity×Sw. Generally, water is electrically conductive and results in low resistivity. Hydrocarbons, kerogen, and most rock minerals do not conduct electricity, thus, the rock matrix and hydrocarbon fluids result in high resistivity. Both source rock and reservoir rock will have hydrocarbons displacing water in at least some of the pore space, and hence are difficult to distinguish based on resistivity alone, i.e. both zones will show elevated resistivity as is the case in FIG. 11. Sonic logs respond to porosity, but there is an additional sonic component due to low-velocity organic matter, and this component is not seen by resistivity. Thus, it takes both sonic and resistivity measurements (or the RDelta Log R equivalents), after scaling and baselining, to recognize and distinguish mature source rock (including shale gas) from a conventional hydrocarbon-bearing reservoir (sandstone or carbonate). In traditional well-based Δ Log R applications, a gamma ray log will help make the distinction between reservoir and source rock, as can readily be seen from FIG. 2 or FIG. 11, but in typical applications of the present invention, a gamma log will not be available.

Preferred embodiments of the invention may have some or all of the following features. The subsurface is characterized electromagnetically by cells of anisotropic resistivity suitable for the 3D solution of Maxwell's equations of electromagnetism by the method of finite differences, using frequency-domain methods. A suitable anisotropic resistivity starting model is constructed using prior knowledge of the area, models for analogous geologic areas, plus reconnaissance CSEM data acquired in the area when these are available. The CSEM data are processed using multiple electric-field data components at all useful measured frequencies (determined using signal-to-noise criteria), supplemented by CSEM magnetic-field data and magnetotelluric data where such data meet quality and coverage criteria. The 3D inversion is performed on a massively parallel computer, and is conducted such that the final solution is fully converged (that is, further iterations produce negligible improvement in the misfit criteria (see Commer et al., 2008, op. cit.)). Values of vertical and horizontal resistivity at the targeted subsurface locations (positions and depths) are extracted from the final converged resistivity solution.

In a preferred implementation of the invention, the subsurface is characterized seismically by cells of anisotropic velocity and isotropic density suitable for the 3D solution of the elastic wave propagation equations by the method of finite differences, using time-domain methods. A suitable anisotropic velocity starting model is constructed using prior knowledge of the area, seismic models for analogous geologic areas, plus reconnaissance seismic (e.g. 2D) data acquired in the area when these are available. Preferably, the seismic interval P-wave horizontal and vertical velocities are estimated by nonlinear inversion of the seismic data using a least-squares conjugate-gradient method on a massively parallel computer, to produce a 3D volume (image) of the velocity structure. Values of vertical and horizontal velocity at the targeted subsurface locations (positions and depths) are extracted from the final converged velocity solution.

Also in preferred embodiments, the processed and imaged seismic data are interpreted in 3D for the subsurface patterns, characteristics, and attributes that tend to indicate non-source and ORR source rock locations and depth intervals. These locations and depth intervals are used to support selection of the depth intervals in which the RDelta Log R resistivity and velocity curves are base-lined, and to support identification of source rock intervals in the RDelta Log R analysis, within the resolution of the geophysical data. A brief summary of some of these seismic interpretation techniques follows.

Seismic reflection terminations and configurations are interpreted as stratification patterns, and are then used for recognition and correlation of depositional sequences, interpretation of depositional environment, and estimation of lithofacies (Mitchum, Vail, and Sangree, "Seismic Stratigraphy and Global Changes of Sea Level: Part 6. Stratigraphic Interpretation of Seismic Reflection Patterns in Depositional Sequences: Section 2. Application of Seismic Reflection Configuration to Stratigraphic Interpretation, Seismic Stratigraphy—Applications to Hydrocarbon Exploration," *AAPG Memoir* 26, 117-133 (1977)). This is basically a geological approach to interpreting geophysical data that aims to extract the maximum amount of information regarding paleo-geomorphology, depositional environments, and lithofacies through adding geological context and sedimentological insights. It provides a robust alternative approach to strictly geophysical methods of determining lithotypes. The unique properties of seismic reflections allow the direct application of geological concepts based on physical stratigraphy (Vail, Todd and Sangree, "Seismic Stratigraphy and Global Changes of Sea Level, Part 5: Chronostratigraphic Significance of Seismic Reflections, in Seismic Stratigraphy—Applications to Hydrocarbon Exploration," *AAPG Memoir* 26, 99-116 (1977). Seismic stratigraphy involves (1) seismic-sequence analysis: subdividing the seismic section into sequences that are the seismic expression of depositional sequences, i.e. stratigraphic units of relatively conformable, genetically related strata bounded by unconformities or their correlative conformities, and (2) seismic-facies analysis: analyzing the configurations of reflections interpreted as strata within depositional sequences to determine environmental setting and to estimate lithology (Vail and Mitchum, "Seismic Stratigraphy and Global Changes of Sealevel, in Seismic Stratigraphy—Applications to Hydrocarbon Exploration," *AAPG Memoir* 26, 49-212 (1977).

Seismic-sequence analysis subdivides seismic sections into packages of concordant reflections (seismic sequences, interpreted as depositional sequences), that are separated by surfaces of discontinuity identified by systematic reflection terminations (Mitchum, Vail and Sangree, supra). There are two fundamental types of terminations: lapout and truncation: lapout is the lateral termination of a stratum at its original depositional limit; truncation is the lateral termination of a stratum as a result of being cut off from its original depositional limit by erosion or deformation (Mitchum, Vail and Thompson III, "Seismic Stratigraphy and Global Changes of Sea Level: Part 2. The Depositional Sequence as a Basic Unit for Stratigraphic Analysis: Section 2, Application of Seismic Reflection Configuration to Stratigraphic Interpretation, Seismic Stratigraphy—Applications to Hydrocarbon Exploration," *AAPG Memoir* 26, 53-62 (1977)). Reflection terminations interpreted as stratal terminations include onlap, downlap, toplap, and erosional truncation. Terminations may be further categorized by their position within a depositional sequence: "baselap" at the base of a depositional sequence (which includes onlap and downlap), toplap at the top, and truncation laterally. These types are determined with greater confidence where several strata within the sequence show a systematic pattern of discordance along a particular surface.

Seismic facies analysis is the description, mapping, and geologic interpretation of seismic reflection parameters within a chronostratigraphic framework of sequence boundaries and downlap surfaces (after Mitchum, Vail, and Sangree, 1977 supra). The interpreter delineates the external form, internal reflection parameters, and three-dimensional associations of seismic facies units, and then can interpret the units in terms of environmental setting, depositional processes, and estimates of lithotype. This interpretation is always done within a stratigraphic framework of depositional sequences, to insure the analysis of genetically related strata. Basic-seismic facies information includes: 1) the relation of reflections to their upper and lower sequence boundaries (segments of onlap, downlap, toplap, truncation, and concordance; and direction of onlap and downlap); and 2) the dominant types of reflection configuration between upper and lower sequence boundaries (parallel, divergent, sigmoid, oblique, etc.).

Subsurface intervals likely to contain fine-grained lithotypes tend to be recorded on seismic data by concordant reflections with no apparent truncation below and downlap or onlap above.

Also in preferred embodiments, the interval vertical resistivity curve in units of Ohm-meters is overlain on the vertical P-wave (acoustic) curve, reciprocated to sonic transit time in units of microseconds per foot, and scaled to the vertical resistivity curve as described herein above, with the two curves base-lined using the interpreted seismic data and the character of the resistivity and transit time curves. Finally, LOM is estimated using basin modeling, and the magnitude of the RDelta Log R response is interpreted for total organic content (TOC) using the level of maturity (LOM) estimate. It is noted that when traditional well-based Delta Log R is applied, the LOM estimate is made from measurements from well-derived samples or estimates from well log data. Using a method such as a basin model built on remote sensing data to estimate LOM in the present inventive method is consistent with the assumption that the value of the invention is best appreciated when no well information from the target area is available.

Once TOC is estimated by the present inventive method, shale-gas reservoir potential, or seal potential of the subsurface region, may also be estimated based on known empirical relationships between TOC content and shale-gas reservoir potential (e.g., Lewis et al., http://www.sipes-houston.org/Presentations/Pickens%20-%20Shale%20Gas.pdf (2004)) and between TOC content and hydrocarbon seal character (e.g., Dawson and Almon, "Top Seal Character and Sequence Stratigraphy of Selected Marine Shales in Gulf Coast Style Basins," *Gulf Coast Association of Geological Societies Transactions* 49, 190-197 (1999)).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

A particular modification and variation of the present invention is to use it to identify optimum locations for shale gas exploration, so-called shale gas "sweet spots", by deriving additional information on the mechanical strength properties of the earth from seismic inversion methods, and then combining that information with determination of TOC as described in this invention, together with estimates of the total gas in place ("GIP") which correspond to the TOC determined within the shale gas reservoir. Estimating total GIP in shale reservoirs is complicated by the variability of the gas location within shale rocks, including within the kerogen, matrix porosity, and natural cracks and fractures. An overview and some recent progress on this topic is reported by R. Ambrose ("New Pore-scale Considerations for Shale Gas in Place Calculations", SPE 131772, www.ogs.ou.edu\MEETINGS\Presentation\Shales2010\Ambrose.pdf). Typically less than 20 percent of the GIP is produced from a shale gas reservoir.

Methods such as elastic prestack inversion, as described previously in this document for determining interval velocity and density, can be extended to use full-waveform seismic data (for example, reflections, refractions, direct waves, and multiples) in order to predict the ability to artificially fracture (by hydraulic or other means) the shale gas reservoir. This mechanical property is called fracability, and has a high value in shale gas reservoirs that can be easily fractured. Artificial fracturing increases the effective permeability and thus producibility of the shale gas. Generally, fracability increases as the rock becomes more brittle. The degree of brittleness can be described in terms of a brittleness index that is a function of the stiffness parameters Possion's ratio (v) and Young's modulus (E) of the rock. These two stiffness parameters are often converted to the Lame' parameters of incompressibility Lambda ($\lambda$) and rigidity Mu ($\mu$) (Goodway, "AVO and Lame' constants for rock parameterization and fluid detection", CSEG RECORDER 26, 39-60, (2001)). The two Lame' constants are fundamental in the physics of elastic seismic waves propagation, and can be determined by seismic inversion techniques. Graphical cross-plot techniques can also be used if appropriate ranges of v, E, $\lambda$, and $\mu$ are known (Goodway, et al., "Practical applications of P-wave AVO for unconventional gas Resource Plays—I: Seismic petrophysics and isotropic AVO", CSEG RECORDER, Special Issue 31, 90-95 (2006)).

This brief discussion of detecting shale gas "sweet spots" using an extension of the remote geophysical methods of the present invention illustrates one of many modifications and variations to the embodiments described herein for practioners skilled in the art.

The invention claimed is:

1. A method for remotely assessing hydrocarbon source rock potential of a subsurface region, source rock potential being measured by total organic carbon content, comprising:
    (a) obtaining electromagnetic field data representative of the subsurface region from a survey conducted above the subsurface region;
    (b) obtaining reflection data from a surface seismic survey of the subsurface region;
    (c) extracting a vertical profile of an anisotropic component of resistivity or its reciprocal, conductivity, from the electromagnetic data and a vertical profile of an anisotropic component of acoustic velocity or its reciprocal quantity, transit time, from the seismic reflection data, thus generating two profiles hereinafter called the resistivity profile and the transit time profile, wherein said anisotropic components are selected based on sensitivity to total organic carbon content;
        wherein, an anisotropic component of resistivity means resistivity for a current flow in a specified direction, and an anisotropic component of velocity means a vector component of velocity;
    and
    (d) evaluating depth intervals in the subsurface region for source rock potential based on differences between the two profiles;
wherein at least (c) is performed using a computer.

2. The method of claim 1, wherein the evaluating comprises:
    overlaying the resistivity profile with the transit time profile and comparing them; and interpreting the comparison for indication of one or more source rock layers.

3. The method of claim 2, further comprising applying a relative scaling to amplitudes in the resistivity profile and the transit time profile.

4. The method of claim 3, wherein a scale factor is selected for the relative amplitude scaling on a basis of matching amplitudes between the resistivity profile and the transit time profile in one or more depth zones made up of water-filled, non-organic-rich shale.

5. The method of claim 4, wherein the scale factor is 1 log cycle of resistivity corresponds approximately to 50 μs/ft (164) μs/m) of transit time.

6. The method of claim 3, further comprising baselining the resistivity profile with the transit time profile.

7. The method of claim 6, wherein interpreting the comparison comprises interpreting a separation or non-parallelism between the scaled and baselined resistivity and transit time profiles in terms of organic-rich intervals.

8. The method of claim 2, wherein total organic carbon (TOC) and level of organic metamorphism (LOM) are estimated for interpreted source rock intervals.

9. The method of claim 8, wherein the LOM estimation is derived from basin modeling.

10. The method of claim 8, wherein the TOC estimation is made using the estimated LOM and the well-log-based Delta Log R diagram tool.

11. The method of claim 8, wherein the TOC and LOM estimations are made using one or more of an empirical, graphical, or model-based method.

12. The method of claim 1, wherein the resistivity profile is of either horizontal resistivity or vertical resistivity, and the velocity profile is of either horizontal velocity or vertical velocity.

13. The method of claim 1, wherein the velocity profile is one of:
    (1) Horizontal acoustic (P-wave) velocity,
    (2) Vertical acoustic (P-wave) velocity,
    (3) Horizontal shear (Sh-wave) velocity,
    (4) Vertical shear (Sv-wave) velocity.

14. The method of claim 1, wherein extracting the velocity profile takes anisotropy of the subsurface region into account.

15. The method of claim 1 wherein said electromagnetic field survey data is or includes magnetotelluric data.

16. The method of claim 1, wherein no well log data from the subsurface region are used.

17. The method of claim 8, wherein TOC for a given depth is estimated by measuring the separation at that depth between the two scaled and baselined profiles, estimating LOM of rock at that depth, and using an empirical correlation between measured separation, LOM and TOC.

18. The method of claim 13, wherein a choice of a velocity profile from the four options listed, and a choice of horizontal resistivity or vertical resistivity for the resistivity profile, is made based on sensitivity to TOC as estimated by model calculations.

19. The method of claim 1, further comprising also using character of the seismic reflection data in evaluating depth intervals in the subsurface region for source rock potential.

20. The method of claim 6, wherein different baselining is used for two or more geologically different depth ranges.

21. A method for producing oil or gas from a subsurface region, comprising:
    (a) obtaining an indication of a source rock layer in the subsurface region by a method as described in claim 1, which is incorporated herein by reference; and
    (b) drilling a well into said source rock layer and producing oil or gas from the well.

22. A method for identifying optimum locations in a subsurface region for shale gas exploration, comprising:
    (a) estimating total organic carbon ("TOC") at a plurality of locations m the subsurface region, using a method of claim 8;
    (b) estimating mechanical strength properties of the subsurface region from inversion of seismic data acquired from the subsurface region, then estimating fracability, at a plurality of locations in the subsurface region, from the mechanical strength properties; and
    (c) determining optimum locations for shale gas exploration based on the TOC and fracability estimates.

23. The method of claim 22, wherein the mechanical strength properties include:
    Lame parameters including incompressibility ($\lambda$) and rigidity ($\mu$); or
    equivalently, stiffness parameters including Poisson's ratio ($\nu$) and Young's modulus (E).

24. The method of claim 22, wherein the inversion of seismic data is elastic prestack inversion of reflection or full-waveform seismic data, wherein full-waveform seismic data includes reflections, refractions, direct waves, and multiples.

25. The method of claim 22, further comprising estimating total gas in place ("GIP"), at a plurality of locations in the subsurface region, and including GIP in making the determination of optimum locations for shale gas exploration.

26. The method of claim 25, wherein GIP is estimated at locations where the TOC estimates suggest shale gas potential.

27. The method of claim 25, wherein GIP is estimated using a remote assessment method.

28. The method of claim 25, wherein the locations for the TOC estimates, the fracability estimates, and the GIP estimates, include a plurality of common locations.

29. The method of claim 1, wherein the anisotropic components of resistivity or conductivity and of velocity or transit time are obtained from inversion of the electromagnetic field data and the seismic reflection data, respectively.

* * * * *